(12) United States Patent
Maede et al.

(10) Patent No.: US 10,730,154 B2
(45) Date of Patent: Aug. 4, 2020

(54) WORKPIECE CONVEYANCE PALLET AND PRODUCTION LINE

(71) Applicant: FANUC CORPORATION, Yamanashi (JP)

(72) Inventors: Yoshihide Maede, Yamanashi (JP); Hiroshi Inutake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 138 days.

(21) Appl. No.: 15/622,505

(22) Filed: Jun. 14, 2017

(65) Prior Publication Data

US 2018/0009075 A1 Jan. 11, 2018

(30) Foreign Application Priority Data

Jul. 8, 2016 (JP) ................................. 2016-136111

(51) Int. Cl.
*B23Q 3/06* (2006.01)
*G05B 19/418* (2006.01)
(Continued)

(52) U.S. Cl.
CPC .............. *B23Q 3/06* (2013.01); *B23Q 7/1494* (2013.01); *B23Q 17/2476* (2013.01);
(Continued)

(58) Field of Classification Search
CPC ........ B23Q 3/06; B23Q 2703/00; B23Q 7/04; B23Q 7/043; B23Q 7/046; B23Q 7/1468;
(Continued)

(56) References Cited

U.S. PATENT DOCUMENTS 5,438,936 A * 8/1995 Wang ..................... B60N 3/001
108/44
10,150,228 B1 * 12/2018 Aleman ................. B28D 7/043
(Continued)

FOREIGN PATENT DOCUMENTS

CN 101502935 A 8/2009
CN 203156636 U 8/2013
(Continued)

OTHER PUBLICATIONS

English Abstract and Machine Translation for Japanese Publication No. 2004-196541 A, published Jul. 15, 2004, 17 pgs.
(Continued)

*Primary Examiner* — Orlando E Aviles
*Assistant Examiner* — Aaron R McConnell
(74) *Attorney, Agent, or Firm* — Fredrikson & Byron, P.A.

(57) ABSTRACT

A workpiece conveyance pallet which can reduce the manufacturing cost and improve the reliability. The workpiece conveyance pallet includes a rest surface on which a workpiece is mounted, and a clamping mechanism which clamps the workpiece, the clamping mechanism including an openable and closable, first claw and second claw, a biasing section which biases the first claw and the second claw in the closing direction, and a movement restriction section which detachably engages with the first claw and the second claw when the first claw and the second claw are opened.

10 Claims, 23 Drawing Sheets

(51) Int. Cl.
   *B23Q 7/14*    (2006.01)
   *B23Q 17/24*   (2006.01)
   *B25J 9/16*    (2006.01)

(52) U.S. Cl.
   CPC ........ *B25J 9/1697* (2013.01); *G05B 19/4182* (2013.01); *G05B 2219/49134* (2013.01); *G05B 2219/50183* (2013.01); *Y02P 90/04* (2015.11); *Y02P 90/083* (2015.11); *Y02P 90/14* (2015.11); *Y02P 90/28* (2015.11)

(58) Field of Classification Search
   CPC .......... B23Q 3/002; B23Q 3/02; B23Q 3/069; B25B 1/06; B25B 5/06; B25B 1/02; B25B 1/24; B25B 1/2405; B25B 1/2489; B25B 5/006; B25B 5/02; B25B 5/166; G05B 2219/49134; F16B 2/16
   USPC ............................................. 269/227, 254 R
   See application file for complete search history.

(56) References Cited

U.S. PATENT DOCUMENTS

| | | | |
|---|---|---|---|
| 2007/0022582 A1* | 2/2007 | Carnevali | A45F 5/00 24/523 |
| 2014/0168890 A1* | 6/2014 | Barnard | G06F 1/1626 361/679.55 |
| 2016/0325693 A1 | 11/2016 | Kim | |
| 2017/0136960 A1* | 5/2017 | Kim | B60R 11/0241 |

FOREIGN PATENT DOCUMENTS

| | | | |
|---|---|---|---|
| CN | 103692259 A | | 4/2014 |
| JP | 6456939 U | | 4/1989 |
| JP | 20049200 A | | 1/2004 |
| JP | 2004196541 A | * | 7/2004 |
| JP | 2004196541 A | | 7/2004 |
| JP | 2005219146 A | | 8/2005 |
| JP | 2005342971 A | * | 12/2005 |
| KR | 101566660 B1 | | 11/2015 |
| WO | 2014115244 A1 | | 7/2014 |

OTHER PUBLICATIONS

English Machine Translation for Japanese Publication No. JPS64-056939 U, published Apr. 10, 1989, 2 pgs.
Untranslated Decision to Grant a Patent mailed by Japan Patent Office (JPO) for Application No. JP 2016-136111, dated Jul 31, 2018, 3 pages.
English Machine Translation of Decision to Grant a Patent mailed by Japan Patent Office (JPO) for Application No. JP 2016-136111, dated Jul. 31, 2018, 3 pages.
English Machine Translation of Notification of Reasons for Refusal mailed by Japan Patent Office (JPO) for Application No. JP 2016-136111, dated May 22, 2018, 4 pages.
Untranslated Notification of Reasons for Refusal mailed by Japan Patent Office (JPO) for Application No. JP 2016-136111, dated May 22, 2018, 5 pages.
English Abstract and Machine Translation for Japanese Publication No. 2004-009200 A, published Jan. 15, 2004, 17 pgs.
English Abstract for Korean Publication No. 101566660 B1, published Nov. 5, 2015, 2 pgs.
English Abstract and Machine Translation for Japanese Publication No. 2005-219146 A, published Aug. 18, 2005, 8 pgs.
English Abstract and Machine Translation for International Publication No. WO2014/115244 A1, published Jul. 31, 2014, 15 pgs.
English Abstract and Machine Translation for Chinese Publication No. 203156636 U, published Aug. 28, 2013, 4 pgs.
English Abstract and Machine Translation for Chinese Publication No. 103692259 A, published Apr. 2, 2014, 6 pgs.
English Abstract and Machine Translation for Chinese Publication No. 101502935 A, published Aug. 12, 2009, 8 pgs.

* cited by examiner

WORKPIECE CONVEYANCE PALLET AND PRODUCTION LINE

BACKGROUND OF THE INVENTION

1. Field of the Invention

The invention relates to a workpiece conveyance pallet and a production line.

2. Description of the Related Art

In production lines, workpiece conveyance pallets which clamp and unclamp workpieces to handle tasks such as workpiece assembly or workpiece processing are known (e.g., Japanese Unexamined Patent Publication (Kokai) No. 2004-9200).

The conventional workpiece conveyance pallets may preferably involve actuators which operate by power such as compressed gas or electric power supplied from external devices to produce forces for clamping workpieces. The use of such actuators complicates the structures of production lines, resulting in higher manufacturing costs and lower reliability.

SUMMARY OF THE INVENTION

In an aspect of the invention, a workpiece conveyance pallet includes a rest surface on which a workpiece is placed, and a clamping mechanism configured to clamp the workpiece placed on the rest surface. The clamping mechanism includes a first claw and a second claw arranged on the rest surface so as to be open and close, and configured to clamp the workpiece. At least one of the first claw and the second claw is movable with respect to the rest surface.

The clamping mechanism further includes a biasing section configured to bias the at least one of the first claw and the second claw in a closing direction, and a movement restriction section which detachably engages the at least one of the first claw and the second claw when the first claw and the second claw are opened. The movement restriction section restricts movement of the at least one of the first claw and the second claw in the closing direction when it engages the at least one of the first claw and the second claw, while it allows the at least one of the first claw and the second claw to move in the closing direction by an action of the biasing section when it detaches from the at least one of the first claw and the second claw.

The first claw and the second claw may be movable with respect to the rest surface. The clamping mechanism may further include an interlocking mechanism configured to interlock movements of the first claw and the second claw in the opening directions, and interlock movements of the first claw and the second claw in the closing directions.

The interlocking mechanism may include a first tooth formed at the first claw, a second tooth formed at the second claw, and a gear interposed between the first tooth and the second tooth so as to engage the first tooth and the second tooth. The clamping mechanism may further include a second biasing section configured to bias the movement restriction section toward a position to engage the at least one of the first claw and the second claw.

The clamping mechanism may further include a handling section configured to engage and move the movement restriction section from a position, where the movement restriction section engages the at least one of the first claw and the second claw, in a direction to detach from the at least one of the first claw and the second claw. The workpiece conveyance pallet may include a plurality of the clamping mechanisms.

In another aspect of the invention, a production line includes a robot, a controller configured to control the robot, and the above-mentioned workpiece conveyance pallet.

When the first claw and the second claw are opened so that the movement restriction section engages the at least one of the first claw and the second claw and the workpiece is placed between the first claw and the second claw, the controller operates the robot so as to detach the movement restriction section from the at least one of the first claw and the second claw to allow the at least one of the first claw and the second claw to move in the closing direction by the action of the biasing section.

When the workpiece is clamped between the first claw and the second claw, the controller operates the robot so as to move the at least one of the first claw and the second claw in the opening direction by the robot.

The production line may further include an imaging section configured to image the workpiece conveyance pallet. The controller operates the robot so as to detach the movement restriction section from the at least one of the first claw and the second claw by the robot, based on an image imaged by the imaging section. The controller operates the robot so as to move the at least one of the first claw and the second claw in the opening direction by the robot, based on an image imaged by the imaging section.

The workpiece conveyance pallet may further include a handling section configured to engage and move the movement restriction section from a position, where the movement restriction section engages the at least one of the first claw and the second claw, in a direction to detach from the at least one of the first claw and the second claw. The controller handles the handling section by the robot so as to move the movement restriction section in the direction to detach when detaching the movement restriction section from the at least one of the first claw and the second claw.

BRIEF DESCRIPTION OF THE DRAWINGS

The above-mentioned and other objects, features, and advantages of the invention will become more apparent from the following description of embodiments with reference to the accompanying drawings, in which.

DETAILED DESCRIPTION

Figure 1:
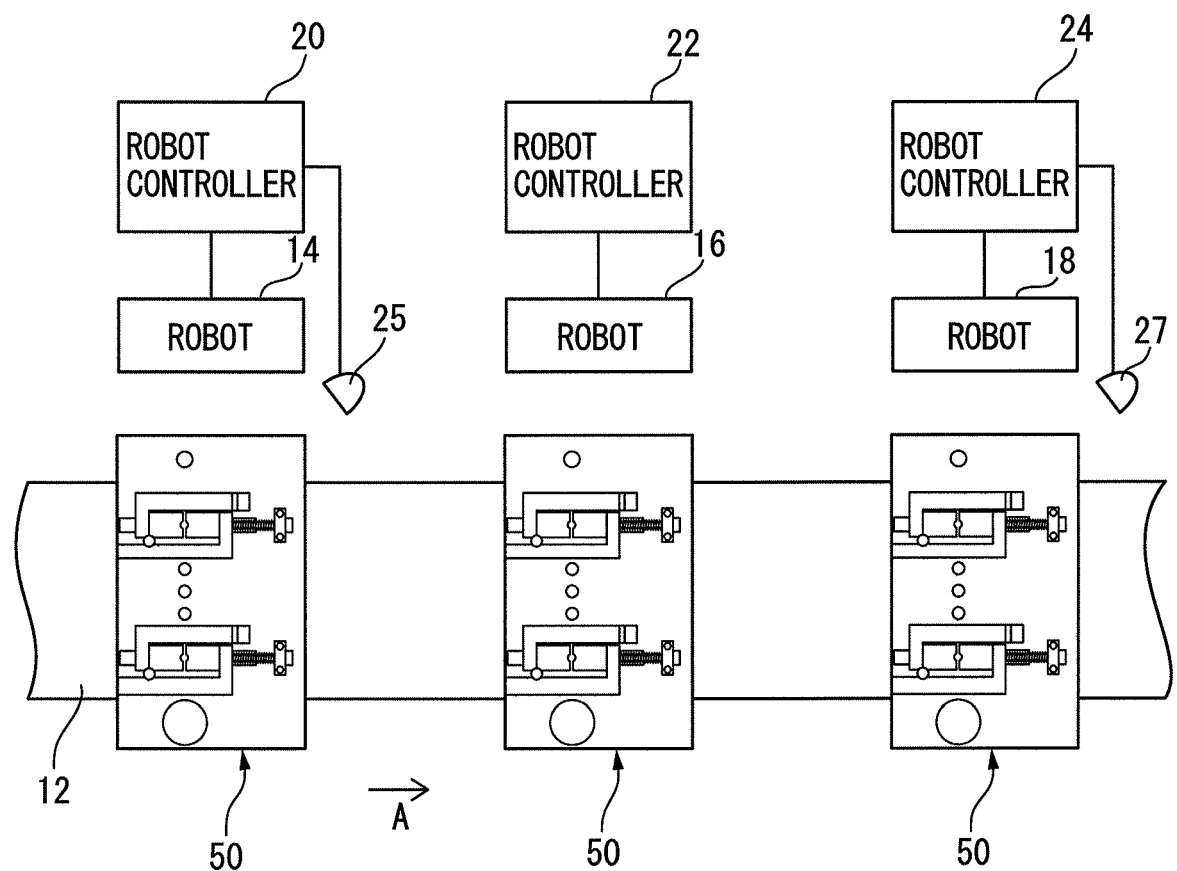
FIG. 1 is a diagram illustrating a production line according to an embodiment.

Embodiments of the invention will be described in detail below with reference to the drawings. Note that, in various embodiments described hereinafter, similar elements are assigned the same reference numerals, and overlapping descriptions will be omitted.

A production line 10 according to an embodiment of the invention will be described below with reference to FIG. 1. The production line 10 includes a conveyor 12, robots 14, 16, and 18, robot controllers 20, 22, and 24, imaging sections 25 and 27, and workpiece conveyance pallets 50.

The conveyor 12 conveys the workpiece conveyance pallets 50 placed on it in a direction indicated by an arrow A in FIG. 1. The robot 14 causes the workpiece conveyance pallet 50 placed on the conveyor 12 to clamp a workpiece (not illustrated).

The robot 16 is located downstream of the robot 14. The robot 16 is e.g. an assembling robot, a processing robot, or a welding robot, and carries out a work, such as workpiece assembly, processing, or welding, on the workpiece clamped on the workpiece conveyance pallet 50.

The robot 18 is located downstream of the robot 16, and unclamps the workpiece clamped on the workpiece conveyance pallet 50. The configurations and functions of the robots 14 and 18 will be described later.

The robot controllers 20, 22, and 24 control the robots 14, 16, and 18, respectively, in accordance with commands from a robot program or host controller. Each of the robot controllers 20, 22, and 24 includes a CPU and a storage (neither is illustrated).

The imaging section 25 is e.g. a three-dimensional vision sensor. The imaging section 25 images the workpiece conveyance pallet 50 conveyed to a position of the robot 14 by the conveyor 12, and sends the captured image data to the robot controller 20.

Similarly, the imaging section 27 is e.g. a three-dimensional vision sensor, and images the workpiece conveyance pallet 50 conveyed to a position of the robot 18 by the conveyor 12 so as to send the captured image data to the robot controller 24.

Figure 2:
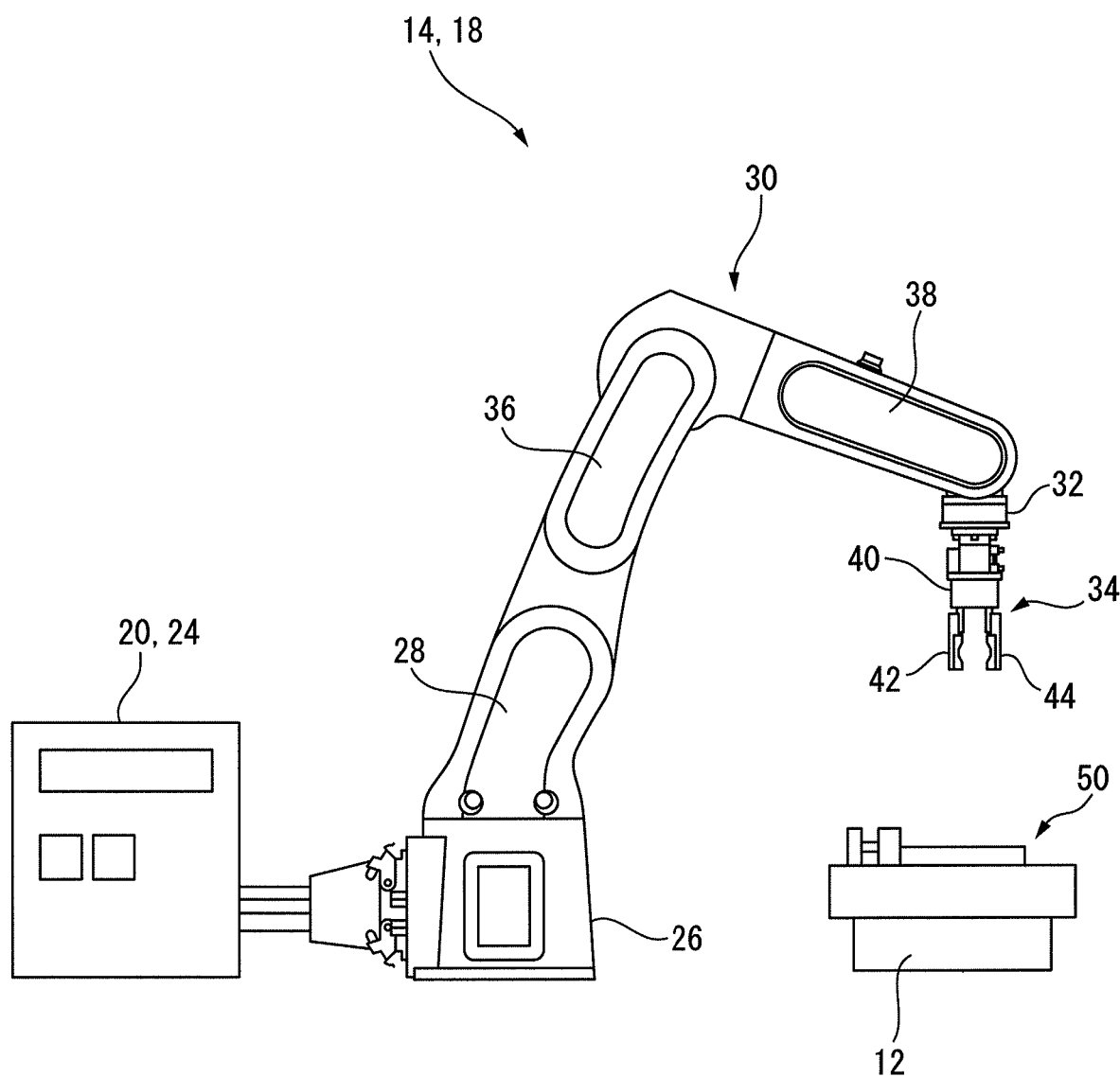
FIG. 2 is a diagram for explaining the configuration of a robot shown in FIG. 1.

The robot 14 will be described below with reference to FIG. 2. In this embodiment, the robot 14 is a vertical multi-articulated robot, and includes a robot base 26, a revolving drum 28, a robot arm 30, a wrist 32, and a robot hand 34.

The robot base 26 is fixed on a floor of a work cell. The revolving drum 28 is provided on the robot base 26 so as to be rotatable about the vertical axis. The robot arm 30 includes an upper arm 36 rotatably connected to the revolving drum 28, and a forearm 38 rotatably connected to the distal end of the upper arm 36.

The wrist 32 is attached to the distal end of the forearm 38 and supports the robot hand 34 so as to be rotatable about three axes. The robot hand 34 includes a hand base 40 connected to the wrist 32, and fingers 42 and 44 provided at the hand base so as to open and close.

The robot controller 20 sends commands to servomotors (not illustrated) built in the revolving drum 28, the robot arm, and the wrist 32 so as to drive these movable elements to arrange the robot hand 34 at any position and posture. Further, the robot controller 20 sends a command to a servomotor (not illustrated) built in the robot hand 34 so as to open and close the fingers 42 and 44.

In this embodiment, the robot 18 has the same configuration as that of the robot 14. More specifically, the robot 18 includes a robot base 26, a revolving drum 28, a robot arm 30, a wrist 32, and a robot hand 34, similarly as the robot 14.

The robot controller 24 sends commands to servomotors (not illustrated) built in the revolving drum 28, the robot arm, the wrist 32, and the robot hand 34 so as to operate these elements.

Next, the workpiece conveyance pallet 50 will be described with reference to FIGS. 3 to 16. Note that, in the following description, the orthogonal coordinate system in the drawings is used as a standard of directions, wherein the x-axis plus direction is referred to as the rightward direction, the y-axis plus direction is referred to as the frontward direction, and the z-axis plus direction is referred to as the upward direction, for the sake of convenience.

Figure 3:
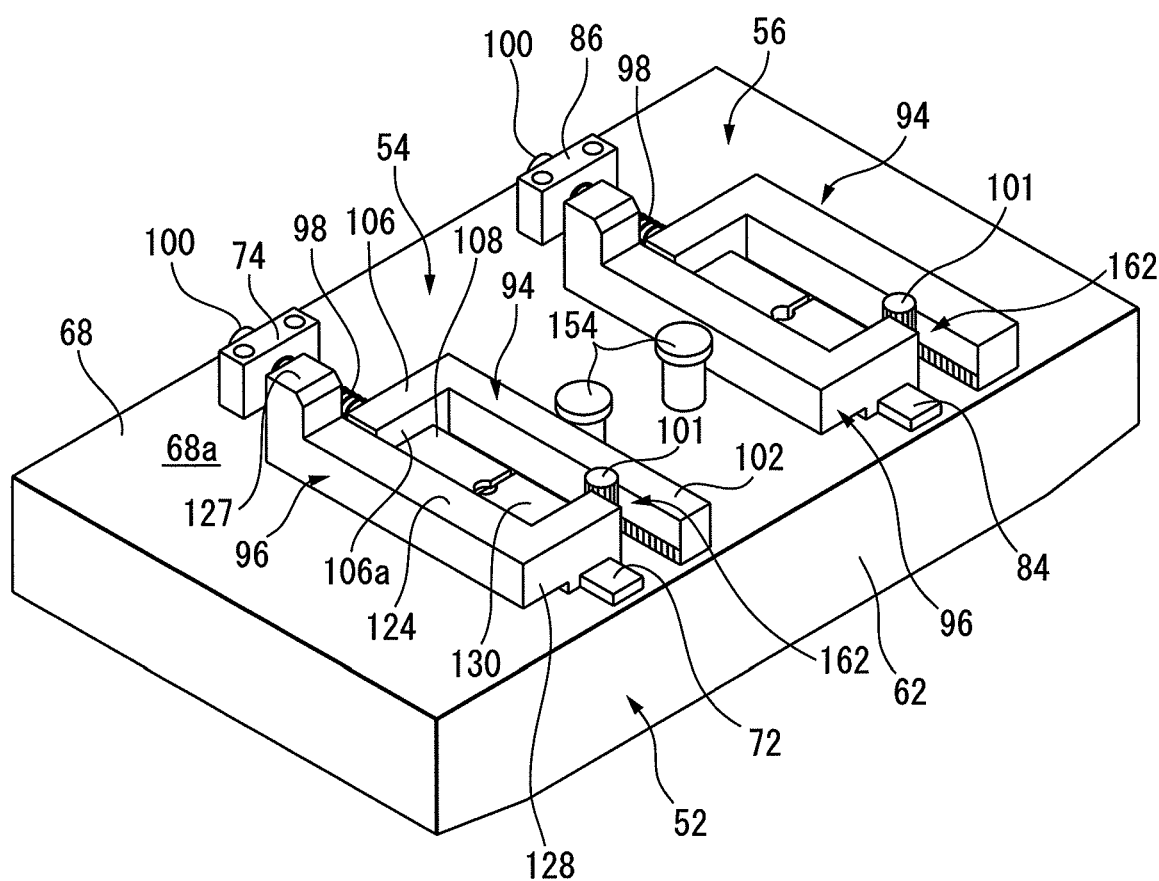
FIG. 3 is a perspective view of a workpiece conveyance pallet according to an embodiment.
Figure 4:
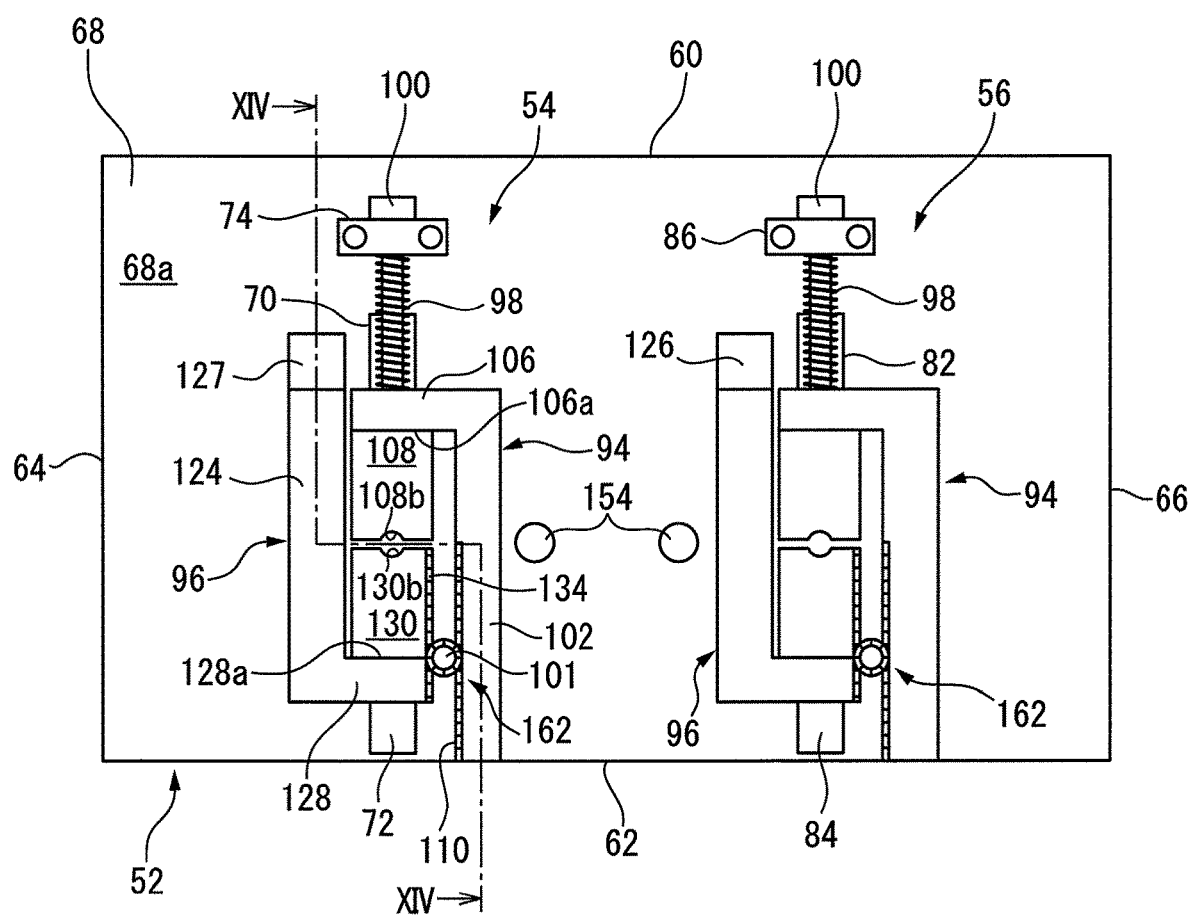
FIG. 4 is a top view of the workpiece conveyance pallet shown in FIG. 3.

As shown in FIGS. 3 and 4, the workpiece conveyance pallet 50 includes a rest 52, a first clamping mechanism 54, and a second clamping mechanism 56.

Figure 5:
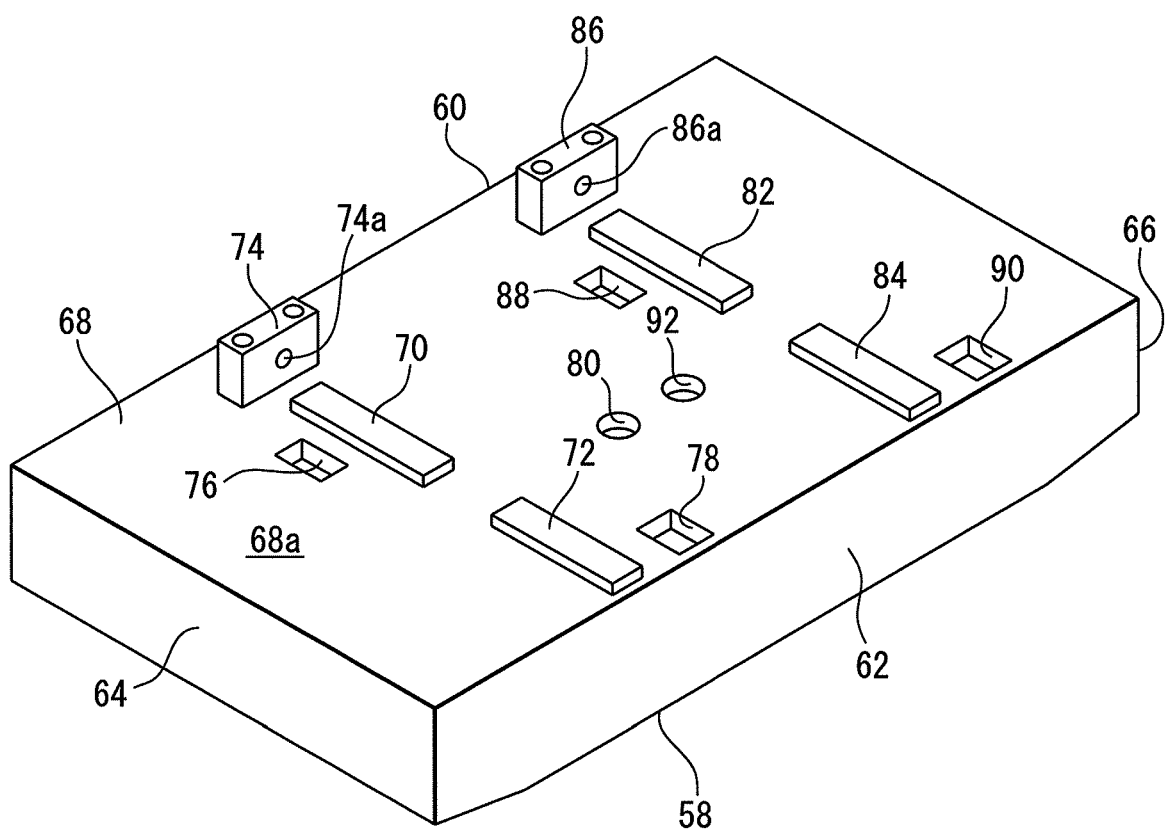
FIG. 5 is a perspective view of a rest shown in FIG. 3.
Figure 6:
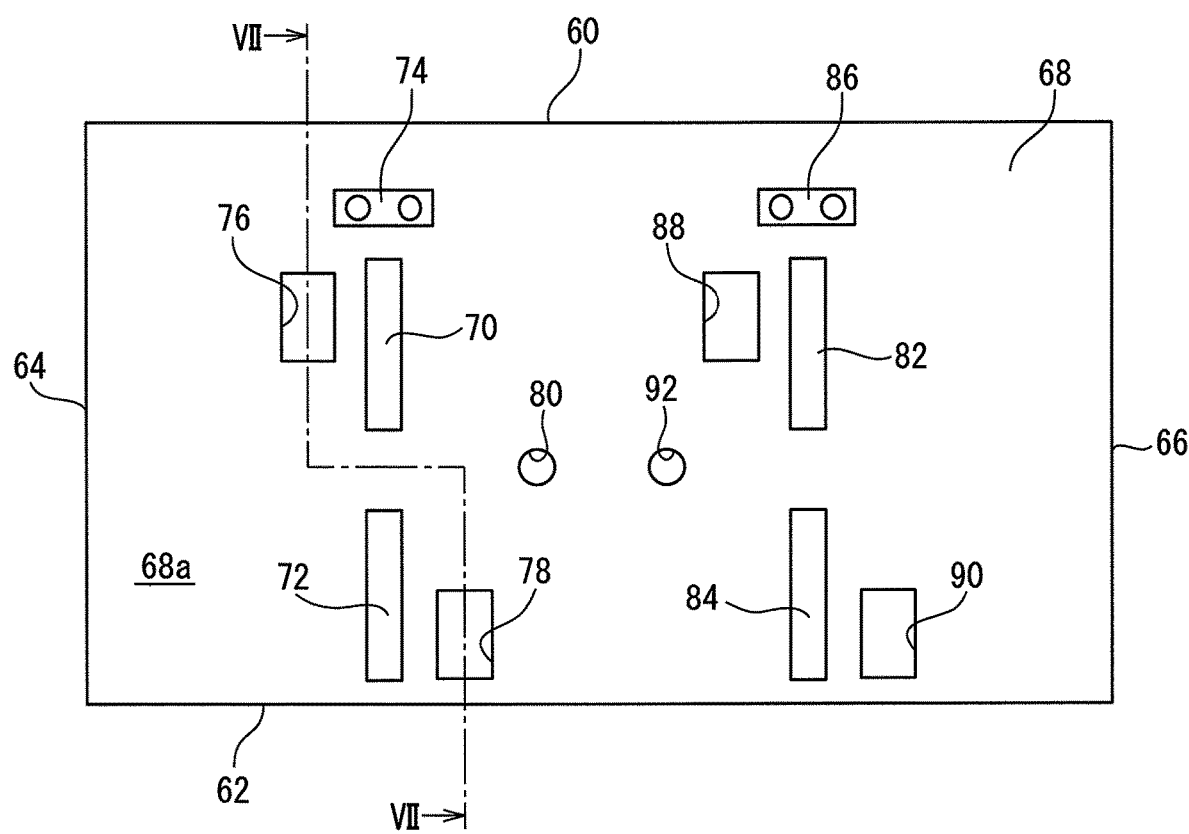
FIG. 6 is a top view of the rest shown in FIG. 5.
Figure 7:
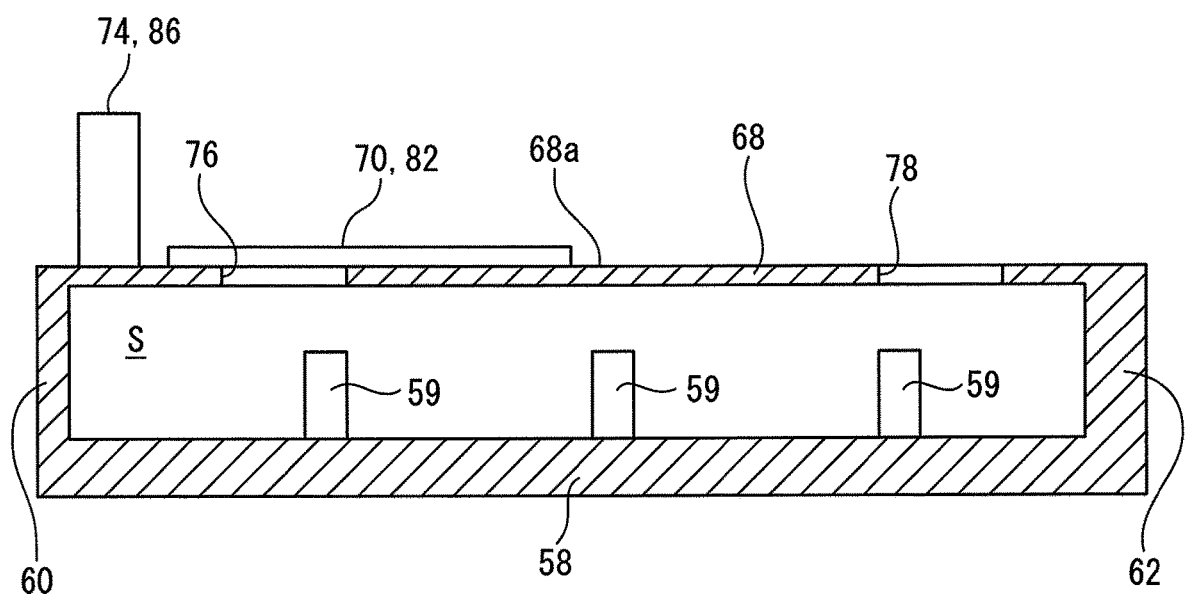
FIG. 7 is a sectional view taken along VII-VII in FIG. 6.

As shown in FIGS. 5 to 7, the rest 52 includes a hollow rectangular parallelepiped shape, and includes a bottom wall 58, a front wall 60, a rear wall 62, a left wall 64, a right wall 66, and a top wall 68. The bottom wall 58 is a rectangular flat member.

The front wall 60 and the rear wall 62 extend upward from the front edge and the rear edge of the bottom wall 58 respectively so as to oppose to each other. The left wall 64 and the right wall 66 extend upward from the left edge and the right edge of the bottom wall 58 respectively so as to oppose to each other, and extend between the front wall 60 and the rear wall 62.

The top wall 68 is connected to the upper edges of the front wall 60, the rear wall 62, the left wall 64, and the right wall 66. The front wall 60, the rear wall 62, the left wall 64, the right wall 66, and the top wall 68 define an inner space S (FIG. 7) of the rest 52.

A workpiece is placed on a top surface 68a of the top wall 68. Thus, the top surface 68a functions as a rest surface on which the workpiece is placed. Further, as shown in FIG. 7, shafts 59 are formed at the bottom wall 58 so as to project upward from the bottom wall 58.

The rest 52 further includes guide rails 70 and 72 and a shaft holding section 74. Each of the guide rails 70 and 72 projects upward from the top surface 68a of the top wall 68, and linearly extends in the y-axis direction.

Figure 8:
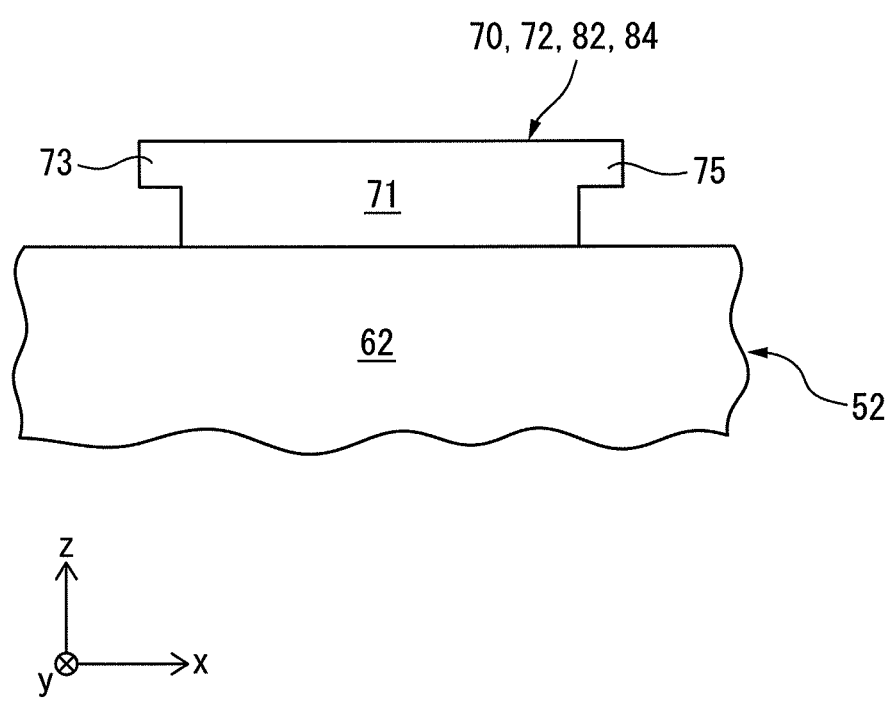
FIG. 8 is an enlarged view of a guide rail shown in FIG. 5 when viewed from rear side.

The guide rails 70 and 72 are arranged at the same x-axis position as each other, and spaced away from each other in the y-axis direction. As shown in FIG. 8, each of the guide rails 70 and 72 includes a rail 71 and flanges 73 and 75 projecting laterally from the upper end of the rail 71.

The shaft holding section 74 projects upward from the top surface 68a of the top wall 68, and is arranged frontward of the guide rail 70. A through hole 74a is formed at the shaft holding section 74 so as to extend through the shaft holding section 74 in the y-axis direction.

Through holes 76, 78, and 80 are formed at the top wall 68. The through hole 76 is an elongate hole elongated in the y-axis direction, and arranged so as to be adjacent to the left side of the guide rail 70. The through hole 78 is an elongate hole elongated in the y-axis direction, and arranged so as to be adjacent to the right side of the guide rail 72. The through hole 80 is a circular hole, and arranged so as to be separated rightward from the through hole 78.

The rest 52 further includes guide rails 82 and 84, and a shaft holding section 86. The guide rails 82 and 84 and the shaft holding section 86 have the same configurations as those of the guide rails 70 and 72 and the shaft holding section 74, respectively.

More specifically, the shaft holding section 86 includes a through hole 86a, and each of the guide rails 82 and 84 includes a rail 71 and flanges 73 and 75, as shown in FIG. 8.

The top wall 68 is formed with through holes 88, 90, and 92 which respectively correspond to the above-mentioned through holes 76, 78, and 80. The through hole 92 is arranged so as to be adjacent to the right side of the through hole 80.

Referring again to FIGS. 3 and 4, the first clamping mechanism 54 includes a first claw 94, a second claw 96, a biasing section 98, a shaft 100, and a gear 101. The first claw 94 and the second claw 96 are provided at the top surface 68a of the rest 52 so as to be open and close.

Figure 9:
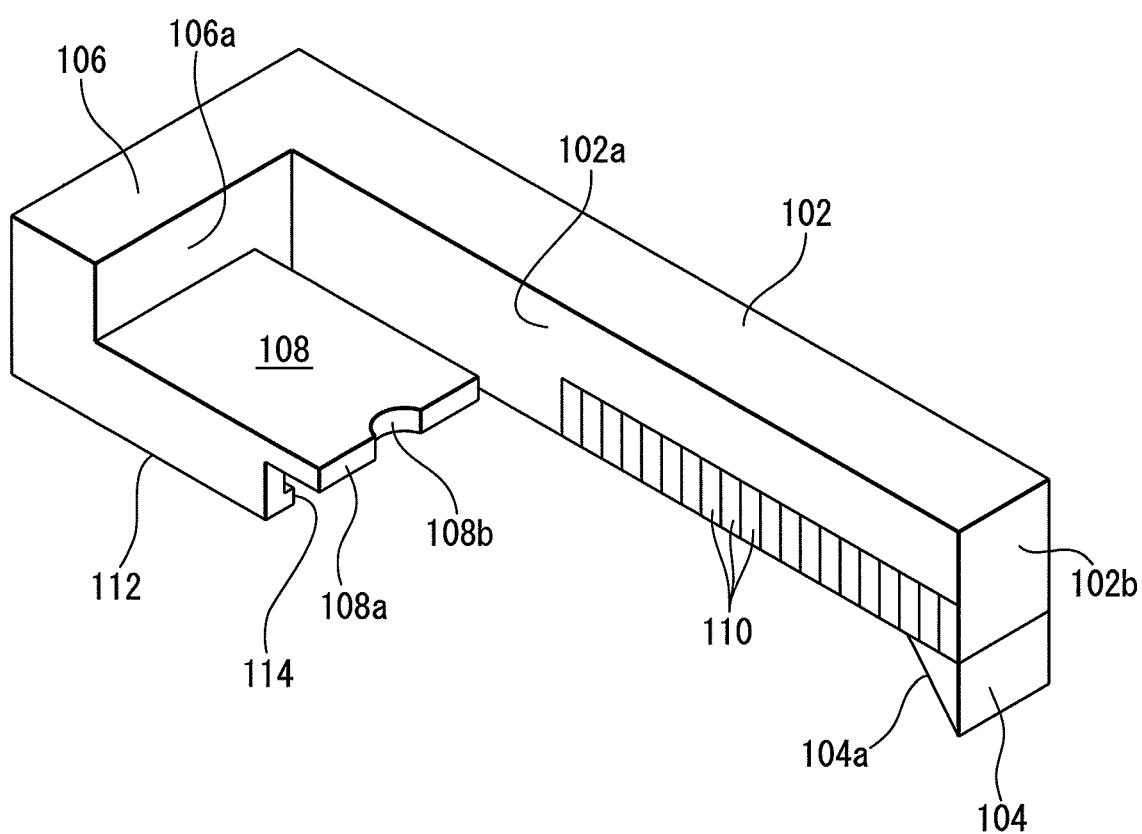
FIG. 9 is an enlarged view of a first claw shown in FIG. 3.

As shown in FIGS. 3, 4, and 9, the first claw 94 includes a longitudinal block 102 linearly extending in the y-axis direction, an engagement section 104 extending downward from the rear end of the longitudinal block 102, a lateral block 106 projecting leftward from the front end of the longitudinal block 102, and a clamp section 108 projecting rearward from a rear face 106a of the lateral block 106.

Teeth 110 (first teeth) are formed at a left face 102a of the longitudinal block 102 so as to align in the y-axis direction. A recess 108b is formed at a rear face 108a of the clamp section 108 so as to be recessed inward from the rear face 108a. The engagement section 104 includes an inclined surface 104a inclined with respect to the z-axis.

Figure 10:
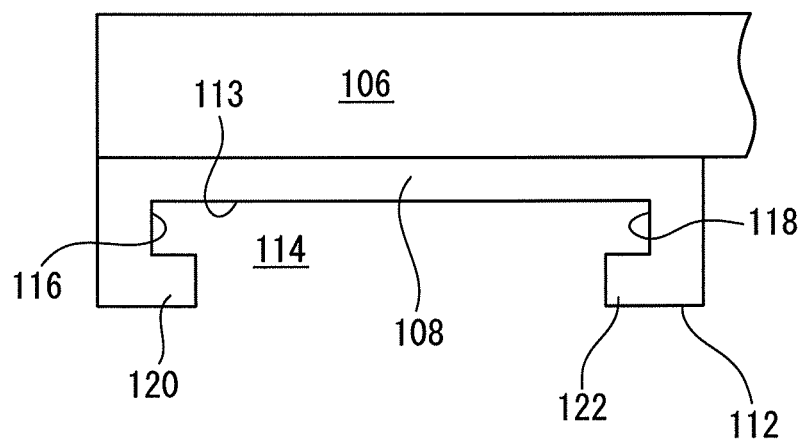
FIG. 10 is an enlarged view of a clamp shown in FIG. 9 when viewed from rear side.
Figure 10:
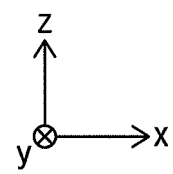

As shown in FIGS. 9 and 10, recess 114 is formed at a bottom surface 112 of the lateral block 106 and the clamp section 108 so as to be recessed inward from the bottom surface 112.

The recess 114 is defined by an end face 113 substantially parallel to the bottom surface 112, end faces 116 and 118 opposed to each other and extend downward from the face 113, and claw parts 120 and 122 projecting inward from the end faces 116 and 118, respectively. The recess 114 receives the above mentioned guide rail 70.

Figure 11:
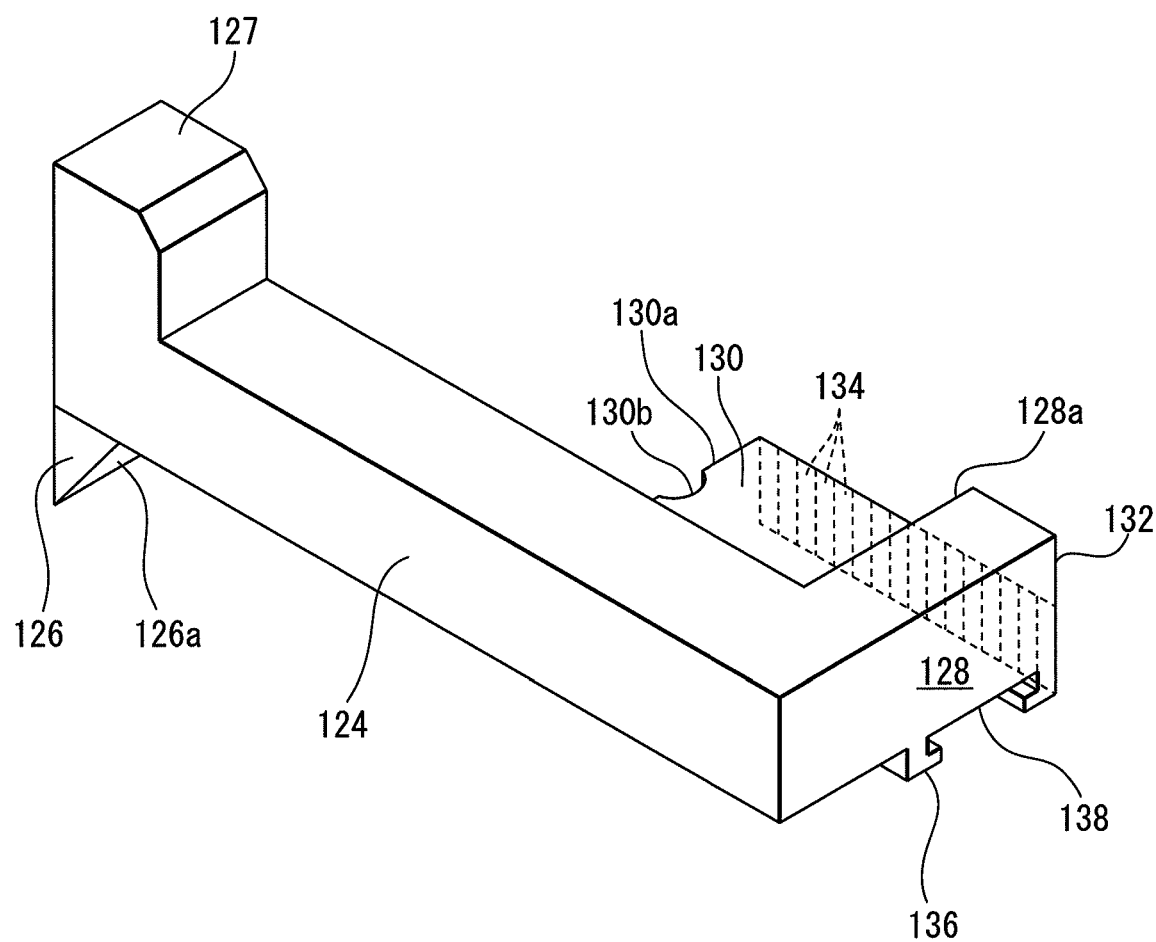
FIG. 11 is an enlarged view of a second claw shown in FIG. 3.
Figure 11:
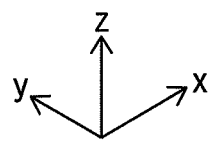

As shown in FIGS. 3, 4, and 11, the second claw 96 includes a longitudinal block 124 linearly extending in the y-axis direction, an engagement section 126 projecting downward from the front end of the longitudinal block 124, a projection 127 projecting upward from the front end of the longitudinal block 124, a lateral block 128 projecting rightward from the rear end of the longitudinal block 124, and a clamp section 130 projecting frontward from a front surface 128a of the lateral block 128.

Teeth 134 (second teeth) are formed at a right face 132 of the lateral block 128 and the clamp section 130 so as to align in the y-axis direction. A recess 130b is formed at a front face 130a of the clamp section 130 so as to be recessed inward from the front face 130a. The engagement section 126 includes an inclined surface 126a inclined with respect to the z-axis.

Figure 12:
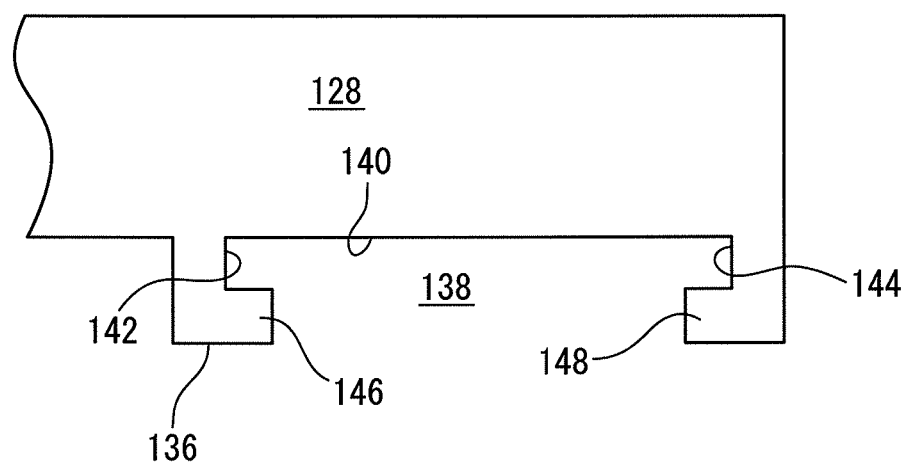
FIG. 12 is an enlarged view of a lateral block shown in FIG. 11 when viewed from rear side.
Figure 12:
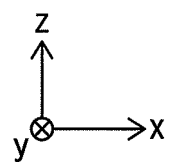

As shown in FIGS. 11 and 12, a recess 138 is formed at a bottom surface 136 of the lateral block 128 and the clamp section 130 so as to be recessed inward from the bottom surface 136.

The recess 138 is defined by a end face 140 substantially parallel to the bottom surface 136, end faces 142 and 144 opposed to each other and extend downward from the end face 140, and claws 146 and 148 projecting inward from the faces 142 and 144, respectively. The recess 138 receives the above-mentioned guide rail 72.

Figure 13:
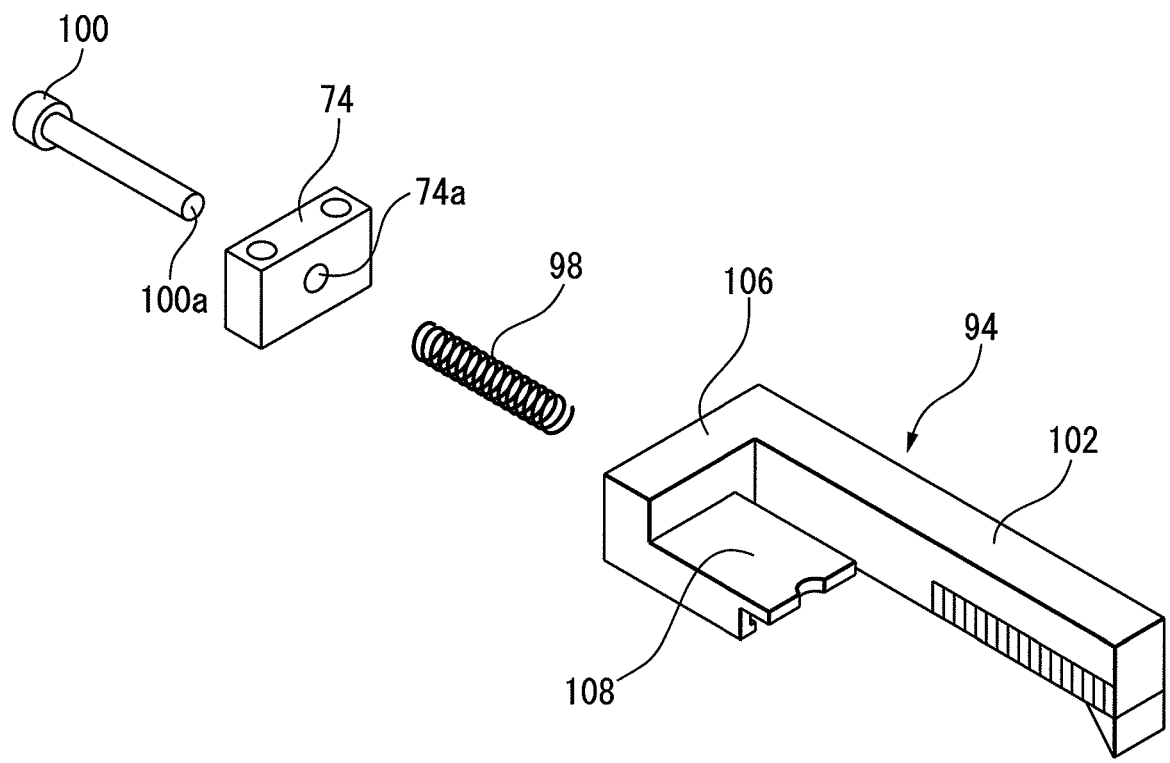
FIG. 13 is an exploded view of the first claw, a biasing section, and a shaft shown in FIG. 3.

As shown in FIGS. 3, 4, and 13, the biasing section 98 is interposed between the shaft holding section 74 provided at the rest 52 and the lateral block 106 of the first claw 94. In this embodiment, the biasing section 98 is a coil spring and biases the first claw 94 rearward.

The shaft 100 is slidably inserted into the through hole 74a in the shaft holding section 74, and its tip 100a is fixed to the lateral block 106 of the first claw 94. Further, the shaft 100 is inserted into the biasing section 98, thereby, the biasing section 98 is positioned at a predetermined position.

As shown in FIGS. 3 and 4, the gear 101 is interposed between the teeth 110 formed at the first claw 94 and the teeth 134 formed at the second claw 96 so as to engage the teeth 110 and 134. The gear 101 is mounted on the top surface 68a of the top wall 68 so as to be rotatable about the vertical axis.

Next, the attachment structure of the first claw 94 and the second claw 96 to the rest 52 will be described with reference to FIGS. 3, 4, and 14 to 16.

Figure 15:
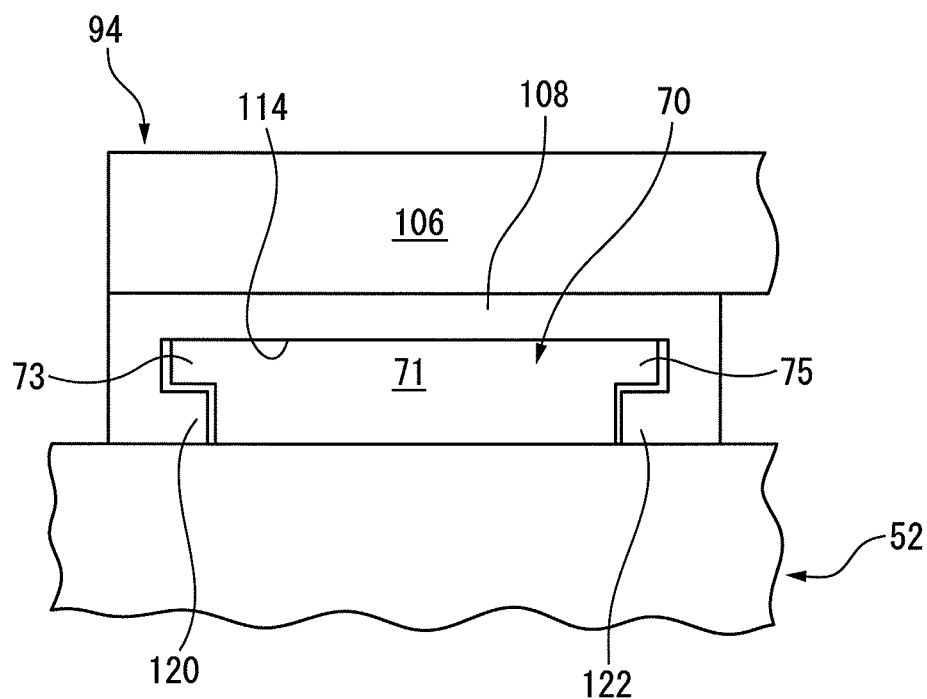
FIG. 15 is a diagram illustrating a condition where the first claw engages the guide rail.

When the first claw 94 is attached to the rest 52, the guide rail 70 provided at the rest 52 is received in the recess 114 formed at the first claw 94, as shown in FIG. 15.

In this state, the flanges 73 and 75 of the guide rail 70 engage the claws 120 and 122 provided at the first claw 94 so as to prevent the first claw 94 from detaching upward from the guide rail 70. Due to this configuration, the first claw 94 is guided by the guide rail 70 so as to move in the y-axis direction with respect to the top surface 68a.

Figure 14:
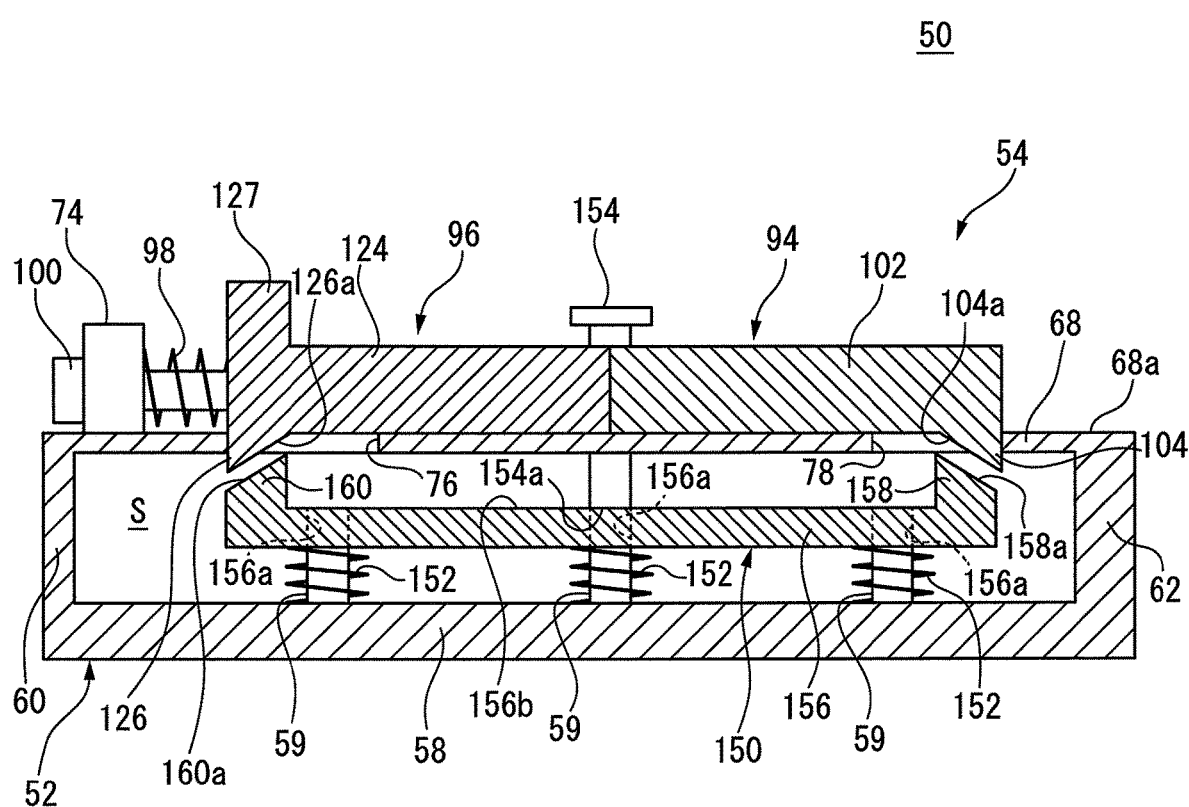
FIG. 14 is a sectional view taken along XIV-XIV in FIG. 4.

The engagement section 104 provided at the longitudinal block 102 of the first claw 94 is received in the through hole 78 formed at the top wall 68 of the rest 52, so that the lower end of the engagement section 104 projects into the inner space S of the rest 52, as shown in FIG. 14.

Figure 16:
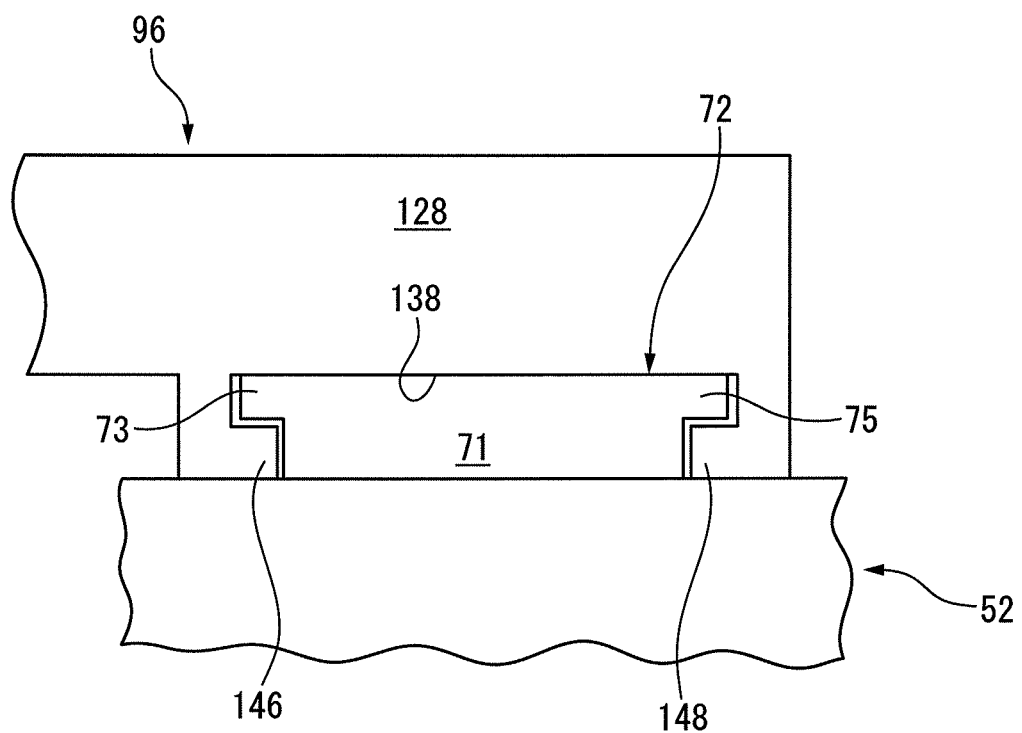
FIG. 16 is a diagram illustrating a condition where the second claw engages the guide rail.
Figure 16:
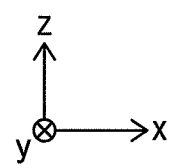

When the second claw 96 is attached to the rest 52, the guide rail 72 provided at the rest 52 is received in the recess 138 formed at the second claw 96, as shown in FIG. 16.

In this state, the flanges 73 and 75 of the guide rail 72 engage the claws 146 and 148 provided at the second claw 96 so as to prevent the second claw 96 from detaching upward from the guide rail 72. Due to this configuration, the second claw 96 is guided by the guide rail 72 so as move in the y-axis direction with respect to the top surface 68a.

The engagement section 126 provided at the longitudinal block 124 of the second claw 96 is received in the through hole 76 formed at the top wall 68 of the rest 52, so that the lower end of the engagement section 126 projects into the inner space S of the rest 52, as shown in FIG. 14.

As shown in FIG. 14, the first clamping mechanism 54 further includes a movement restriction section 150, a biasing section 152 (second biasing section), and a handling section 154. The movement restriction section 150 is arranged in the inner space S of the rest 52, and includes a main body 156 and engagement sections 158 and 160.

The main body 156 is a flat member arranged to be substantially parallel to the x-y plane. Through holes 156a are formed at the main body 156. The shafts 59 formed at the bottom wall 58 of the rest 52 are slidably received in the through holes 156a, respectively. Thus, the movement restriction section 150 can move in the z-axis direction while being restricted in movement in the x-axis and y-axis directions.

The engagement section 158 projects upward from the rear end of the main body 156, and is arranged below the through hole 78 formed at the top wall 68 of the rest 52. The engagement section 158 includes an inclined surface 158a substantially parallel to the inclined surface 104a formed at the engagement section 104 of the first claw 94.

The engagement section 160 projects upward from the front end of the main body 156, and is arranged below the through hole 76 formed at the top wall 68 of the rest 52. The engagement section 160 includes an inclined surface 160a substantially parallel to the inclined surface 126a formed at the engagement section 126 of the second claw 96.

Each biasing section 152 is a coil spring, and is interposed between the movement restriction section 150 and the bottom wall 58 of the rest 52 so as to bias the movement restriction section 150 upward. Each shaft 59 formed at the bottom wall 58 of the rest 52 is inserted into each biasing section 152, thereby the biasing section 152 is positioned at a predetermined position.

The handling section 154 is slidably inserted into the through hole 80 formed at the top wall 68 of the rest 52, so that its lower end 154a contacts a top surface 156b of the main body 156 of the movement restriction section 150.

Referring again to FIGS. 3 and 4, the second clamping mechanism 56 has the same configuration as that of the first clamping mechanism 54. More specifically, the second clamping mechanism 56 includes a first claw 94, a second claw 96, a biasing section 98, a shaft 100, a gear 101, a movement restriction section 150, a biasing section 152, and a handling section 154.

When the first claw 94 of the second clamping mechanism 56 is attached to the rest 52, the guide rail 82 provided at the rest 52 is received in the recess 114 formed at the first claw 94 of the second clamping mechanism 56. The engagement section 104 provided at the longitudinal block 102 of the first claw 94 of the second clamping mechanism 56 is received in the through hole 90 formed at the top wall 68 of the rest 52.

When the second claw 96 of the second clamping mechanism 56 is attached to the rest 52, the guide rail 84 provided at the rest 52 is received in the recess 138 formed at the second claw 96 of the second clamping mechanism 56.

The engagement section 126 provided at the longitudinal block 124 of the second claw 96 of the second clamping mechanism 56 is received in the through hole 88 formed at the top wall 68 of the rest 52. The shaft 100 of the second clamping mechanism 56 is inserted into the through hole 86a of the shaft holding section 86, and its tip 100a is fixed to the first claw 94 of the second clamping mechanism 56.

The movement restriction section 150 of the second clamping mechanism 56 is arranged to be adjacent to the right side of the movement restriction section 150 of the first clamping mechanism 54, in the inner space S of the rest 52, and is biased upward by the biasing section 152 of the second clamping mechanism 56.

The handling section 154 of the second clamping mechanism 56 is slidably inserted into the through hole 92 formed at the top wall 68 of the rest 52, and contacts the movement restriction section 150 of the second clamping mechanism 56.

Next, the function of the workpiece conveyance pallet 50 will be described with reference to FIGS. 3, 4, 14, and 17. Each of the first clamping mechanism 54 and the second clamping mechanism 56 clamps and unclamps a workpiece placed on the top surface 68a of the rest 52.

Below, the operation for clamping and unclamping a workpiece by the first clamping mechanism 54 will be described. FIGS. 3, 4, and 14 show that the first claw 94 and the second claw 96 are in a closed state.

In the closed state, the rear face 108a (FIG. 9) of the clamp section 108 of the first claw 94 and the front face 130a (FIG. 11) of the clamp section 130 of the second claw 96 are arranged to be adjacent to each other and face each other.

Further, as shown in FIG. 14, the rear end face of the engagement section 104 of the first claw 94 engages a wall surface defining the through hole 78 so as to restrict rearward movement of the first claw 94. Similarly, the front end face of the engagement section 126 of the second claw 96 engages a wall surface defining the through hole 76 so as to restrict frontward movement of the second claw 96.

When clamping the workpiece by the first clamping mechanism 54, the first claw 94 and the second claw 96 are brought into an opened state, firstly. More specifically, the projection 127 of the second claw 96 is pushed rearward (i.e., in the opening direction).

Due to this, the second claw 96 moves rearward with being guided by the guide rail 72, from the position shown in FIGS. 3, 4, and 14. As described above, the inclined surface 126a formed at the engagement section 126 of the second claw 96 is substantially parallel to the inclined surface 160a formed at the engagement section 160 of the movement restriction section 150.

Accordingly, when the second claw 96 is moved rearward from the position shown in FIGS. 3, 4, and 14, the inclined surface 126a slides on the inclined surface 160a and pushes the inclined surface 160a downward. Thereby, the movement restriction section 150 is slightly displaced downward against the biasing force of the biasing section 152, as a result of which, the engagement section 126 can pass over the engagement section 160.

Figure 17:
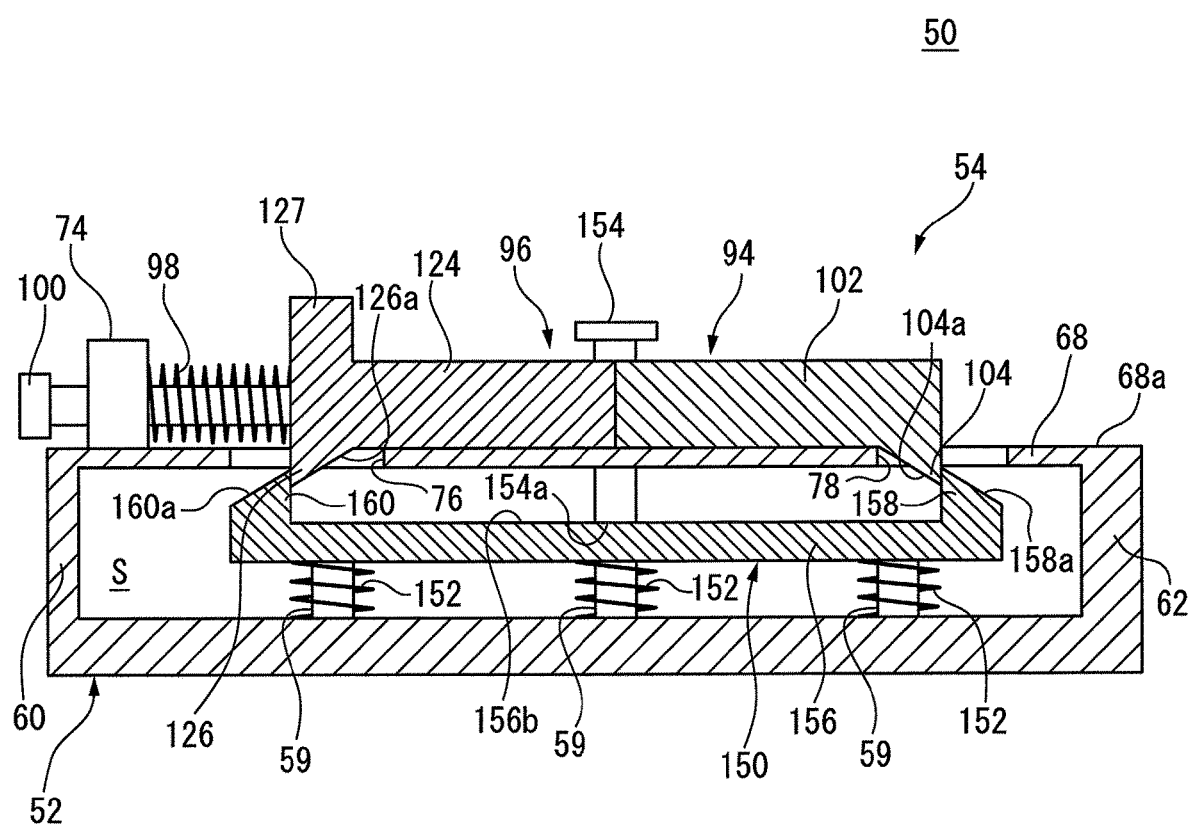
FIG. 17 is a sectional view corresponding to FIG. 14, which illustrates a condition where the first claw and the second claw are closed.

When the engagement section 126 passes the engagement section 160, the movement restriction section 150 returns to the upper position again by the biasing force of the biasing section 152. Then the engagement section 160 engages the engagement section 126, thereby the frontward movement (i.e., the movement in the closing direction) of the second claw 96 is restricted, as shown in FIG. 17.

As the second claw 96 is moved rearward, the teeth 134 formed at the clamp section 130 of the second claw 96 rotate the gear 101 counterclockwise when viewed from upward. As the gear 101 is rotated in this way, the first claw 94 is moved frontward (i.e., in the opening direction) along the guide rail 70 by the engagement between the gear 101 and the teeth 110 formed at the longitudinal block 102 of the first claw 94.

In this manner, in this embodiment, the first claw 94 moves frontwards in conjunction with the rearward movement of the second claw 96 by the actions of the teeth 110 and 134 and the gear 101.

Therefore, the teeth 110 and 134 and the gear 101 constitute an interlocking mechanism 162 (FIGS. 3 and 4) which interlocks the front-rear movement of the first claw 94 and front-rear movement of the second claw 96, respectively.

As described above, the inclined surface 104a formed at the engagement section 104 of the first claw 94 is substantially parallel to the inclined surface 158a formed at the engagement section 158 of the movement restriction section 150. Accordingly, as the first claw 94 is moved frontward, the inclined surface 104a slides on the inclined surface 158a and pushes the inclined surface 158a downward.

Due to this, the movement restriction section 150 is slightly displaced downward against the biasing force of the biasing section 152, as a result of which, the engagement section 104 can pass over the engagement section 158. When the engagement section 104 passes the engagement section 158, the movement restriction section 150 returns to the upper position again by the biasing force of the biasing section 152.

Then the engagement section 158 engages the engagement section 104, thereby the rearward movement (i.e., the movement in the inclosing direction) of the first claw 94 is restricted, as shown in FIG. 17. In this way, the first claw 94 and the second claw 96 are brought into the open state shown in FIG. 17.

In the open state, the rear face 108a (FIG. 9) of the clamp section 108 of the first claw 94 and the front face 130a (FIG. 11) of the clamp section 130 of the second claw 96 are spaced away from each other in the y-axis direction by a certain distance (a distance larger than that in the closed state).

After the first claw 94 and the second claw 96 are in the open state, a workpiece is placed on the top surface 68a of the rest 52 at a position between the clamp sections 108 and 130.

Figure 18:
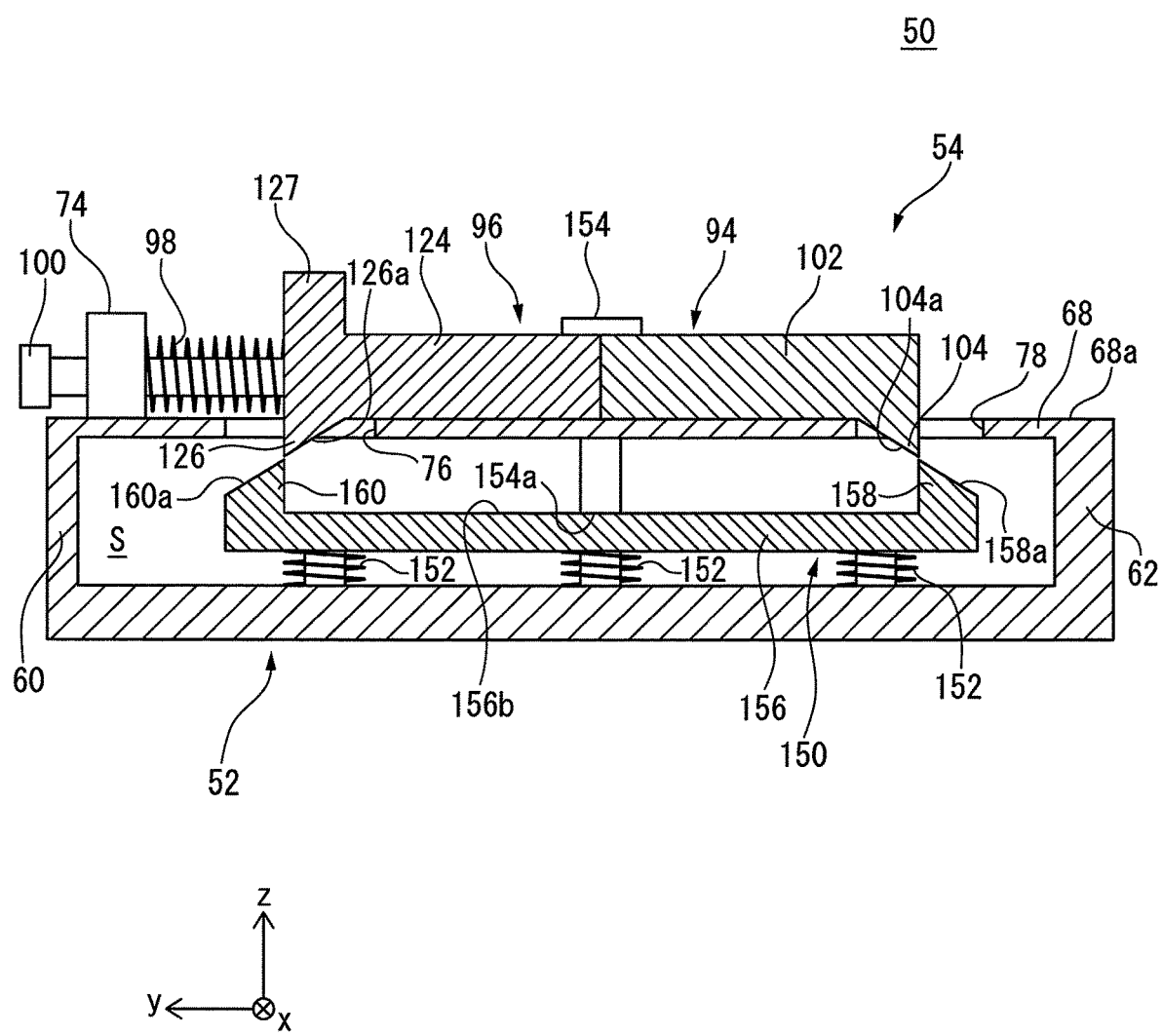
FIG. 18 is a sectional view corresponding to FIG. 14, which illustrates a condition where the movement restriction section shown in FIG. 17 is moved downward by the handling section.

Then, the handling section 154 is pushed downward. The lower end 154a of the handling section 154 contacts the top surface 156b of the movement restriction section 150, as described above. Accordingly, when the handling section 154 is pushed downward, as shown in FIG. 18, the movement restriction section 150 is also moved downward against the biasing force of the biasing section 152.

Thereby, the engagement sections 158 and 160 are disengaged from the engagement sections 104 and 126, respectively, and the engagement between the engagement sections 104 and 158 and the engagement between the engagement sections 126 and 160 are cancelled.

Then, the first claw 94 is moved rearward by the biasing force of the biasing section 98, and the second claw 96 is moved frontward in conjunction with the rearward movement of the first claw 94. As a result, the workpiece is clamped between the clamp sections 108 and 130.

In this embodiment, recesses 108b and 130b are formed at the clamp sections 108 and 130, respectively. The workpiece is stably held in the recesses 108b and 130b upon being clamped between the clamp sections 108 and 130.

When unclamping the workpiece, the first claw 94 and the second claw 96 are bought into the open state again, in the above-mentioned manner. By this, the workpiece can be unclamped from the first clamping mechanism 54.

Note that, since the operation for clamping and unclamping a workpiece by the second clamping mechanism 56 is the same as in the first clamping mechanism 54, a detailed description thereof is omitted.

Next, the operation of the production line 10 will be described with reference to FIGS. 19 to 21. The flow shown in FIG. 19 is started when the robot controller 20, 22, or 24 receives a work-start command from a work program or a host controller.

Figure 19:
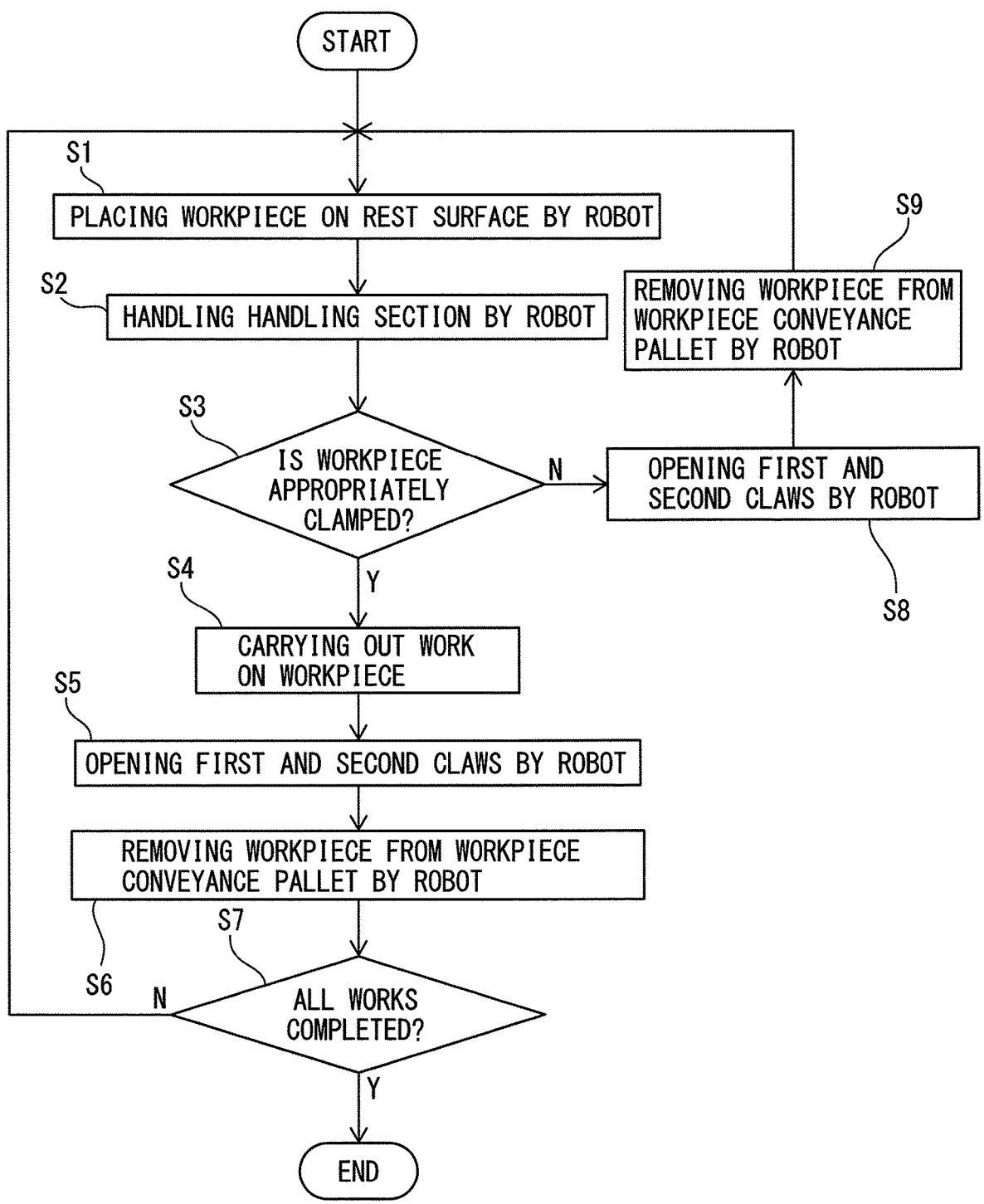
FIG. 19 is a flowchart illustrating an exemplary operation flow of the production line shown in FIG. 1.
Figure 20:
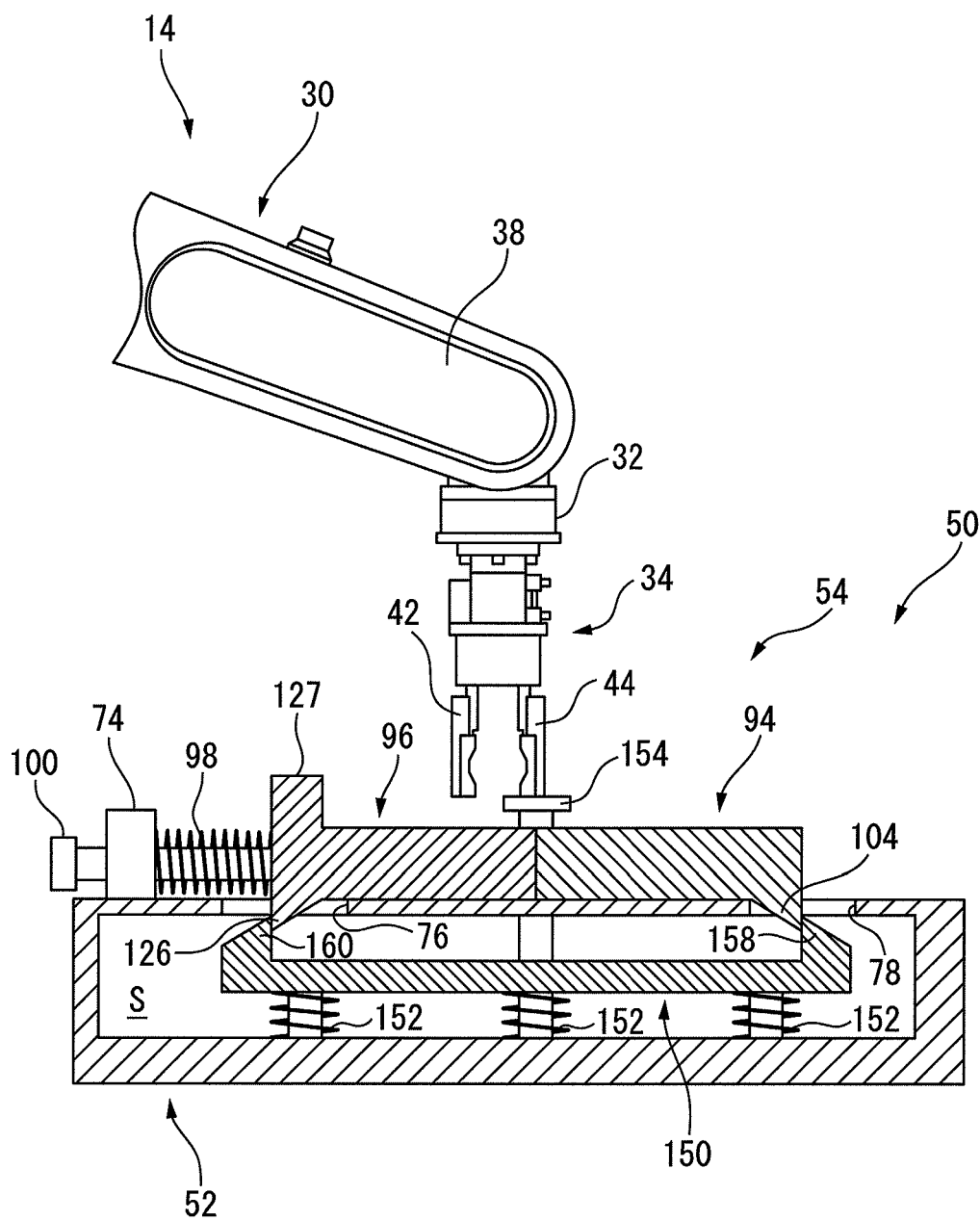
FIG. 20 is a diagram for explaining step S2 in FIG. 19.

After the start of the flow shown in FIG. 19, the workpiece conveyance pallets 50 are placed on the conveyor 12 shown in FIG. 1 at certain intervals. The clamping mechanisms 54 and 56 of all workpiece conveyance pallets 50 located upstream of the robot 14 are in the open state.

At step S1, the robot controller 20 operates the robot 14 so as to place a workpiece on the top surface 68a of the rest 52. More specifically, the robot controller 20 sends a command to the imaging section 25 to image the workpiece conveyance pallet 50 conveyed to the position of the robot 14 by the conveyor 12.

Then, the robot controller 20 sends commands to servomotors built in the robot 14 in accordance with a robot program so as to grip a workpiece stored in a certain location by the robot hand 34.

Then, the robot controller 20 operates the robot 14 based on the image captured by the imaging section 25 so as to place the workpiece gripped by the robot hand 34 at a position between the clamp sections 108 and 130 of the first clamping mechanism 54 in the open state. Similarly, the robot controller 20 places a workpiece at a position between the clamp sections 108 and 130 of the second clamping mechanism 56.

At step S2, the robot controller 20 operates the robot 14 so as to handle the handling section 154. More specifically, the robot controller 20 operates the robot 14 on the basis of the image captured by the imaging section 25 at step S1, so as to place the finger 44 of the robot 14 on the handling section 154 of the first clamping mechanism 54, as shown in FIG. 20.

Then, the robot controller 20 operates the robot arm 30 so as to move the robot hand 34 downward, thereby push the handling section 154 downward. Due to this, the engagement sections 158 and 160 are disengaged from the engagement sections 104 and 126, respectively, thereby the first claw 94 and the second claw 96 move in the closing direction, as described above with reference to FIG. 18. As a result, the workpiece is clamped between the clamp sections 108 and 130.

Similarly, the robot controller 20 operates the robot 14 so as to push the handling section 154 of the second clamping mechanism 56 downward to clamp the workpiece between the clamp sections 108 and 130 of the second clamping mechanism 56.

At step S3, the robot controller 20 determines whether the workpiece is appropriately clamped by the first clamping mechanism 54 and the second clamping mechanism 56. More specifically, the robot controller 20 sends a command to the imaging section 25 to image the workpiece conveyance pallet 50 at the end of step S2.

The robot controller 20 determines whether the workpiece is appropriately clamped by the first clamping mechanism 54 and the second clamping mechanism 56 by comparing the image captured at step S3 with an appropriate image pre-stored in the storage. The appropriate image is an image captured when the workpiece is appropriately clamped by the first clamping mechanism 54 and the second clamping mechanism 56.

When the robot controller 20 determines that the workpiece is appropriately clamped by the first clamping mechanism 54 and the second clamping mechanism 56 (i.e., determines YES), it proceeds to step S4. On the other hand, when the robot controller 20 determines that the workpiece is not appropriately clamped by the first clamping mechanism 54 and the second clamping mechanism 56 (i.e., determines NO), it proceeds to step S8.

At step S4, the robot controller 22 operates the robot 16 so as to carry out a work on the workpiece. More specifically, the conveyor 12 conveys the workpiece conveyance pallet 50 having clamped the workpiece at step S2 to the position of the robot 16, after the step S3.

The robot controller 22 operates the robot 16 in accordance with a robot program so as to carry out a work, such as workpiece assembly, processing, or welding on the workpiece clamped by the workpiece conveyance pallet 50. After the end of step S4, the conveyor 12 conveys the workpiece conveyance pallet 50 having clamped the finished workpiece to the position of the robot 18.

At step S5, the robot controller 24 operates the robot 18 so as to open the first claw 94 and the second claw 96. More specifically, the robot controller 24 sends a command to the imaging section 27 to image the workpiece conveyance pallet 50 conveyed to the position of the robot 18 by the conveyor 12.

Figure 21:
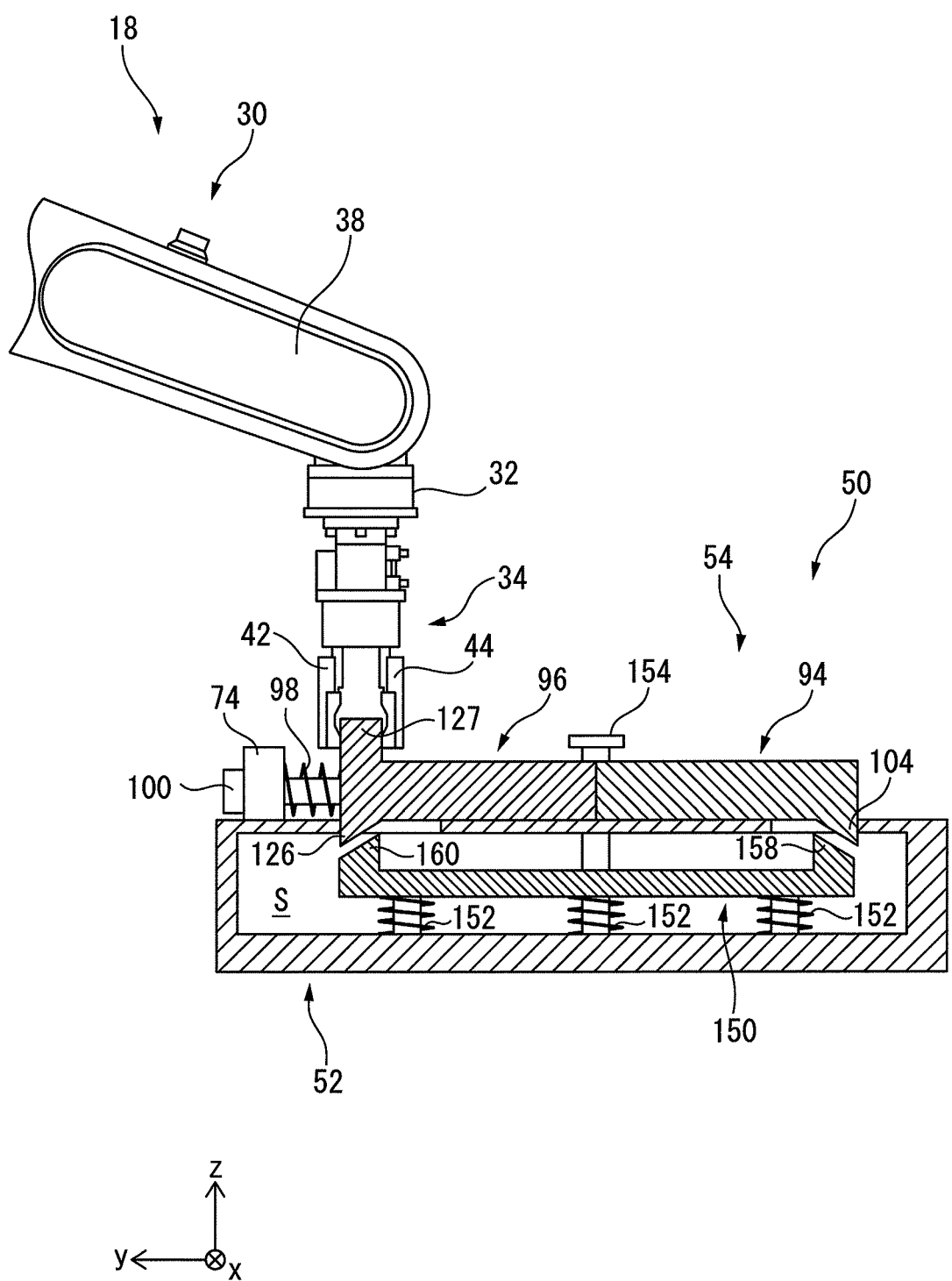
FIG. 21 is a diagram for explaining steps S5 and S8 in FIG. 19.

The robot controller 24 operates the robot 18 on the basis of the image captured by the imaging section 27 so as to grip the projection 127 provided at the second claw 96 of the first clamping mechanism 54 by the robot hand 34, as shown in FIG. 21.

Then, the robot controller 24 operates the robot arm 30 so as to move the robot hand 34 rearward from the state shown in FIG. 21 to push the projection 127 rearward. Due to this, the first claw 94 and the second claw 96 move in the opening direction in conjunction with each other, and are brought into the open state shown in FIG. 17, as described above. Thus, the first clamping mechanism 54 unclamps the workpiece.

Similarly, the robot controller 24 operates the robot 18 so as to push the projection 127 provided at the second claw 96 of the second clamping mechanism 56 rearward to open the first claw 94 and the second claw 96 of the second clamping mechanism 56. Thus, the second clamping mechanism 56 unclamps the workpiece.

At step S6, the robot controller 24 operates the robot 18 so as to remove the workpiece unclamped at step S5 from the workpiece conveyance pallet 50. More specifically, the robot controller 24 sends a command to the imaging section 27 to image the workpiece conveyance pallet 50 opened at step S5.

Then, the robot controller 24 operates the robot 18 on the basis of the image captured by the imaging section 27 so as to grip the workpiece by the robot hand 34 of the robot 18 and carry the gripped workpiece to a certain storage location.

At step S7, the robot controller 20, 22, or 24 determines whether works have been completed for all workpieces. When the robot controller 20, 22, or 24 determines that all works have been completed (i.e., determines YES), it ends the flow shown in FIG. 19. On the other hand, when the robot controller 20, 22, or 24 determines that there is a workpiece remaining unfinished (i.e., determines NO), it returns to step S1.

When it is determined "NO" in step S3, at step S8, the robot controller 20 opens the first claw 94 and the second claw 96 of the clamping mechanism 54 or 56 having been determined not to appropriately clamp the workpiece at step S3.

More specifically, the robot controller 20 opens the first claw 94 and the second claw 96 of the clamping mechanism 54 or 56 inappropriately clamping the workpiece so as to unclamp the workpiece, in the same manner as in step S5 mentioned above.

At step S9, the robot controller 20 operates the robot 14 so as to remove the workpiece unclamped at step S8 from the workpiece conveyance pallet 50. More specifically, the robot controller 20 grips the workpiece by the robot hand 34 of the robot 14 and lifts it up. Then, the robot controller 20 returns to step S1, and places the lifted-up workpiece on the rest 52 again.

In this manner, the workpiece conveyance pallet 50 according to this embodiment moves the first claw 94 and the second claw 96 in the closing direction by the action of the biasing section 98, and keeps the first claw 94 and the second claw 96 in the open state by the movement restriction section 150.

According to this configuration, the first claw 94 and the second claw 96 can be opened and closed by e.g. the robots 14 and 18. Accordingly, since no actuator, which is operated by compressed gas or power such as electric power supplied from an external device, is necessary, the structure of the production line 10 can be simplified. As a result, it is possible to reduce the manufacturing cost and improve the reliability of work.

Further, in the workpiece conveyance pallet 50 according to this embodiment, the first claw 94 and the second claw 96 open and close in conjunction with each other by the interlocking mechanism 162. According to this configuration, since the first claw 94 and the second claw 96 can be opened and closed by single biasing section 98, it is possible to reduce the number of components and simplify the structure of the workpiece conveyance pallet 50.

Further, the workpiece conveyance pallet 50 includes the handling sections 154. According to this configuration, the first claw 94 and the second claw 96 in the open state can be easily closed by e.g. the robot 14.

In the above-mentioned workpiece conveyance pallet 50, both the first claw 94 and the second claw 96 are movable with respect to the rest 52. However, the first claw 94 or the second claw 96 may be fixed to the rest 52.

Figure 22:
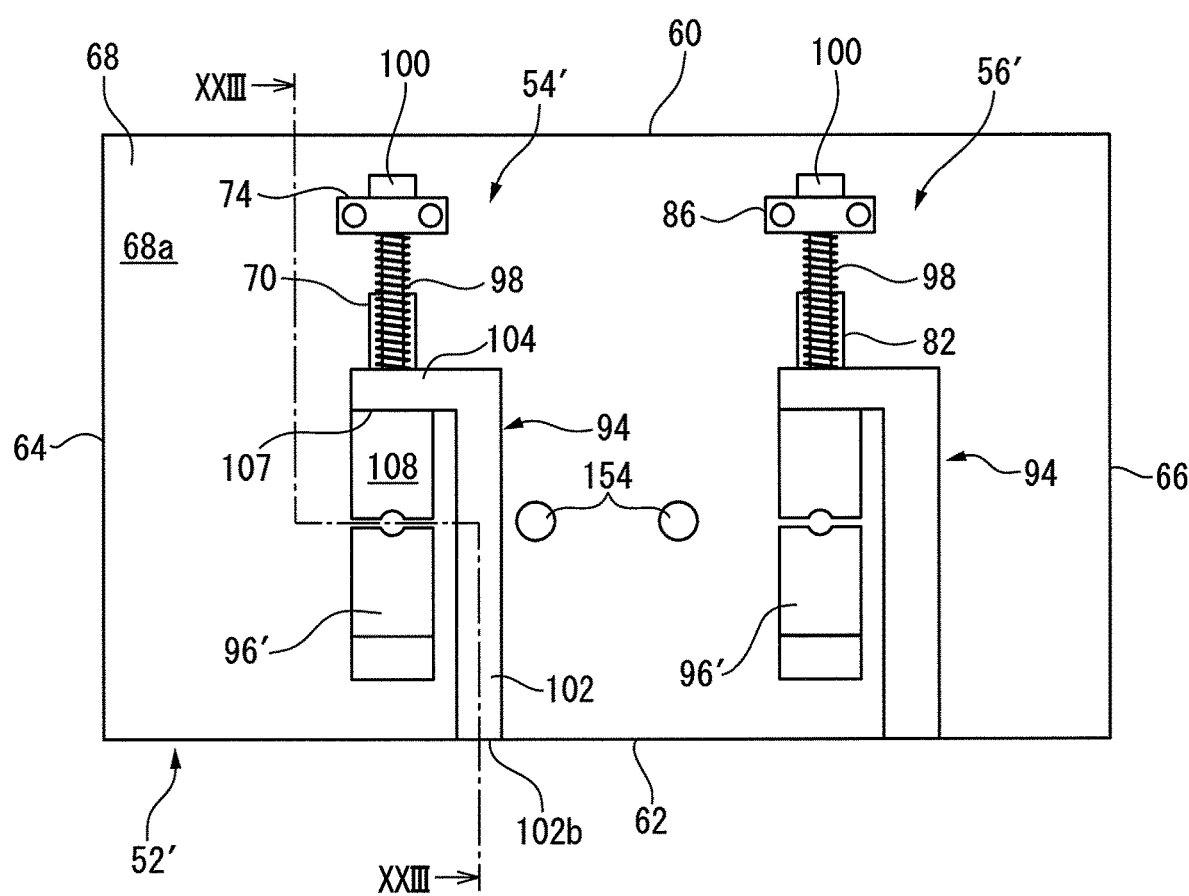
FIG. 22 is a top view of a workpiece conveyance pallet according to another embodiment.
Figure 23:
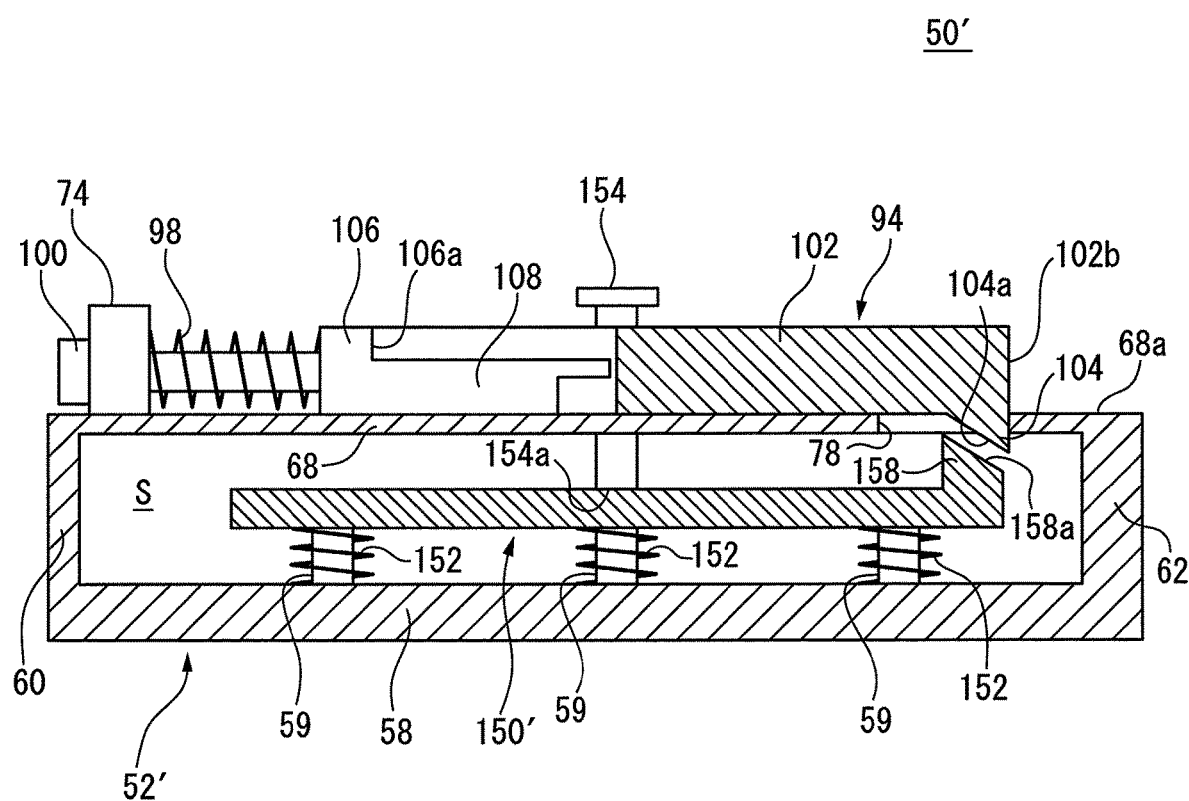
FIG. 23 is a sectional view taken along XXIII-XXIII in FIG. 22.

Such an embodiment will be described below with reference to FIGS. 22 and 23. A workpiece conveyance pallet 50' includes a rest 52', a first clamping mechanism 54', and a second clamping mechanism 56'.

The rest 52' is different from the above-mentioned rest 52 in the feature wherein the rest 52' includes no guide rails 72 and 84 and through holes 76 and 88.

The first clamping mechanism 54' is different from the above-mentioned first clamping mechanism 54 in a second claw 96' and a movement restriction section 150'. Specifically, the second claw 96' is fixed to the top surface 68a of the rest 52'.

The second claw 96' may be fabricated as a member separated from the rest 52', and fixed to the top surface 68a by e.g. a fastener such as a bolt, an adhesive, or welding. Alternatively, the second claw 96' may be provided integrally with the rest 52'.

The movement restriction section 150' is different from the above-mentioned movement restriction section 150 in the feature wherein the movement restriction section 150' includes no engagement section 160.

In this embodiment, when opening the first claw 94 and the second claw 96' (i.e., at step S5 or S8 in FIG. 19), a robot controller 20 or 24 operates a robot 14 or 18 to make the finger 44 or 42 of the robot 14 or 18 to contact a portion of the first claw 94 engageable with the finger 44 or 42.

The engageable portion is e.g. the rear face 102b of the longitudinal block 102 of the first claw 94 or the rear face 106a of the lateral block 106 of the first claw 94.

The robot controller 20 or 24 operates the robot 14 or 18 so as to push the engageable portion frontward (i.e., in the opening direction) by the finger 44 or 42. As a result, the first claw 94 moves frontward so that the first claw 94 and the second claw 96' are opened. At this time, the engagement section 158 of the movement restriction section 150' engages the engagement section 104 of the first claw 94, thereby the rearward movement (i.e., the movement in the closing direction) of the first claw 94 is restricted.

On the other hand, when closing the first claw 94 and the second claw 96' (i.e., at step S2 in FIG. 19), the robot controller 20 operates the robot 14 so as to push the handling section 154 downward, as in the above-described embodiment. Due to this, the engagement section 158 is disengaged from the engagement section 104, thereby the first claw 94 moves in the closing direction. In this way, the first claw 94 and the second claw 96' are closed.

In this embodiment, similarly as the above-described embodiment, since no actuator, which operates by compressed gas or power such as or electric power supplied from external devices, is necessary, the structure of the production line 10 can be simplified.

Note that, in the above-mentioned workpiece conveyance pallet 50, the engagement section 104 of the first claw 94 and the engagement section 158 of the movement restriction section 150 may be omitted. In this case, the engagement section 104 of the movement restriction section 150 engages the engagement section 126 of the second claw 96, thereby the movement of the second claw 96 in the closing direction is restricted.

Since the movements of the first claw 94 and the second claw 96 are interlocked by the interlocking mechanism 162, when the movement of the second claw 96 is restricted, the movement of the first claw 94 is also restricted via the interlocking mechanism 162. Therefore, the first claw 94 and the second claw 96 can be kept in the open state.

Alternatively, instead of the engagement sections 104 and 158, the engagement section 126 of the second claw 96 and the engagement section 160 of the movement restriction section 150 may be omitted.

By omitting the engagement sections 104 and 158 (or the engagement sections 126 and 160) in this way, it is possible to simplify the configurations of the first claw or the second claw and the movement restriction section.

On the other hand, the movement restriction section 150 including all engagement sections 104, 126, 158, and 160 can more stably keep the first claw 94 and the second claw 96 in the open state.

Further, in the above-described embodiment, the biasing section 98 is a coil spring. However, the biasing section 98 may be a magnet or an elastic material (e.g., rubber) which generates a reaction force in response to its displacement when the elastic material is displaced.

For example, if a magnet is applied to the biasing section, a first magnet is fixed to the rear face of the shaft holding section 74, 86, while a second magnet is fixed to the front face of the lateral block 106 of the first claw 94. The magnetic poles of the first magnet and the second magnet are set to generate a magnetic force to urge the first magnet and the second magnet away from each other. Thus, the biasing section comprised of a magnet can bias the first claw 94 in the closing direction.

Further, in the above-described embodiment, another biasing section different from the biasing section 98 may be provided to bias the second claw 96 in the closing direction.

Further, in the above-described embodiment, the imaging sections 25 and 27 may be omitted. In such an embodiment, a positioning means (e.g., a jig) for positioning the workpiece conveyance pallet 50, 50' is provided at the conveyor 12. The workpiece conveyance pallet 50, 50' placed on the conveyor 12 is positioned at a predetermined position in the conveyor 12 by the positioning means.

For example, the positioning means includes holes formed at the bottom wall 58, the front wall 60, the rear wall 62, the left wall 64, the right wall 66, or the top wall 68 of the rest 52, 52'; and pins provided at the conveyor 12 and inserted into the respective holes.

When the flow shown in FIG. 19 is executed in this embodiment, at steps S1, S2, S5, and S6, the robot controller 20, 24 operates the robot 14 in accordance with a robot program so as to execute these steps.

In this embodiment, since the workpiece conveyance pallet 50 is positioned at the predetermined position in the conveyor 12 by the positioning means, the robot controller 20, 24 can execute steps S1, S2, S5, and S6 by operating the robot 14 in accordance with a robot program, without the image captured by the imaging section.

The robot program can be constructed by teaching the robot 14 a plurality of operations against the workpiece conveyance pallet 50 positioned on the conveyor 12 by the positioning means, such as placing a workpiece (step S1), handling the handling section 154 (step S2), opening the claws 94 and 96 (step S5), and removing the workpiece (step S6).

Although the invention has been described above through embodiments of the invention, the above-described embodiments are not intended to limit the invention according to the scope of claims. Although combinations of the features described in the embodiments of the invention may also fall within the technical scope of the invention, all the combinations of the features may not always be involved in solving the problem of the invention. It is evident to those skilled in the art that various changes or modifications may be made to the above-described embodiments.

It should be noted that each type of processing such as operations, procedures, steps, processes, and stages in a device, a system, a program, and a method defined in the scope of claims, the specification, and the drawings may be implemented in an arbitrary order unless otherwise specified as, e.g., "before" or "prior to" or the output of preceding processing is used in subsequent processing. Even when an operation sequence in the scope of claims, the specification, and the drawings is described using, e.g., "first," "next," "then," or "subsequently" for the sake of convenience, this does not mean that the operation sequence may be preferably performed at such a specific order.

The invention claimed is:

1. A workpiece conveyance pallet comprising:
   a rest surface on which a workpiece is placed, and which is formed with first through hole and second through hole extending through the rest surface and arranged successively in a closing direction; and
   a clamping mechanism configured to clamp the workpiece placed on the rest surface,
   wherein the clamping mechanism comprises:
   a first claw and a second claw arranged upside of the rest surface so as to open and close, and configured to clamp the workpiece, at least one of the first claw and the second claw being movable with respect to the rest surface, the first claw including a first engagement section extending so as to pass through the first through hole to underside of the rest surface and the second claw including a second engagement section extending so as to pass through the second through hole to underside of the rest surface a biasing section configured to bias the at least one of the first claw and the second claw in the closing direction; and a movement restriction section positioned underside of the rest surface so as to be opposite to the first and second claws with respect to the rest surface, and configured to disengageably engage the first engagement section and the second engagement section when the first claw and the second claw are opened, wherein the movement restriction section is movable close to or away from the rest surface, between a restricting position where the movement restriction section engages the first engagement section and the second engagement section so as to restrict movement of the first claw and the second claw in the closing direction, and a disengaging position where the movement restriction section is disengaged from the first engagement section and the second engagement section so as to allow the at least one of the first claw and the second claw to move in the closing direction by an action of the biasing section.

2. The workpiece conveyance pallet according to claim 1, wherein the first claw and the second claw are movable with respect to the rest surface, and wherein the clamping mechanism further comprises an interlocking mechanism configured to interlock movements of the first claw and the second claw in the opening directions, and interlock movements of the first claw and the second claw in the closing directions.

3. The workpiece conveyance pallet according to claim 2, wherein the interlocking mechanism comprises:

a first tooth formed at the first claw;

a second tooth formed at the second claw; and a gear interposed between the first tooth and the second tooth so as to engage the first tooth and the second tooth.

4. The workpiece conveyance pallet according to claim 1, wherein the clamping mechanism further comprises a second biasing section configured to bias the movement restriction section toward the restricting position.

5. The workpiece conveyance pallet according to claim 1, wherein the clamping mechanism further comprises a handling section configured to engage and move the movement restriction section from the restricting position to the detaching position.

6. The workpiece conveyance pallet according to claim 1, comprising a plurality of the clamping mechanisms.

7. The workpiece conveyance pallet according to claim 1, wherein the movement restriction section comprises:

a main body positioned away from the rest surface and opposite to the first and second claws; and a third engagement section extending from the main body toward the rest surface, and configured to engage the first engagement section when being positioned at the restricting position.

8. The workpiece conveyance pallet according to claim 7, wherein the first engagement section has a first inclined surface inclined with respect to the closing direction, extending more toward the movement restriction section than the rest surface, the third engagement section has a second inclined surface parallel to the first inclined surface, and the first inclined surface slides on the second inclined surface so as to allow the at least one of the first claw and the second claw to move in an opening direction, when the at least one of the first claw and the second claw is biased in the opening direction.

9. The workpiece conveyance pallet according to claim 1, further comprising a guide mechanism configured to guide movement of the movement restriction section by restricting the movement of the movement restriction section in a direction along the rest surface.

10. The workpiece conveyance pallet according to claim 9, wherein the guide mechanism comprises:

a shaft extending in a direction parallel to a movement direction of the movement restriction section; and a hole formed at the movement restriction section and configured to slidably receive the shaft.

* * * * *